US012744427B2

(12) United States Patent
Sirigere et al.

(10) Patent No.: US 12,744,427 B2
(45) Date of Patent: Sep. 22, 2026

(54) METHOD AND APPARATUS FOR COOLING A ROTOR ASSEMBLY

(71) Applicant: GE AVIATION SYSTEMS LLC, Grand Rapids, MI (US)

(72) Inventors: Gurudatta Srinivasa Murthy Sirigere, Bengaluru (IN); Balamurugan Sridharan, Bengaluru (IN); Sooraj Govindankutty Kocher, Bengaluru (IN)

(73) Assignee: GE AVIATION SYSTEMS LLC, Grand Rapids, MI (US)

(*) Notice: Subject to any disclaimer, the term of this patent is extended or adjusted under 35 U.S.C. 154(b) by 221 days.

(21) Appl. No.: 18/540,226

(22) Filed: Dec. 14, 2023

(65) Prior Publication Data

US 2025/0062657 A1 Feb. 20, 2025

(30) Foreign Application Priority Data

Aug. 16, 2023 (IN) ............................ 202311054914

(51) Int. Cl.

| | |
|---|---|
| ***H02K 9/19*** | (2006.01) |
| ***H02K 1/26*** | (2006.01) |
| ***H02K 1/32*** | (2006.01) |
| ***H02K 3/24*** | (2006.01) |
| ***H02K 3/51*** | (2006.01) |
| ***H02K 3/52*** | (2006.01) |
| ***H02K 5/20*** | (2006.01) |
| ***H02K 7/18*** | (2006.01) |

(Continued)

(52) U.S. Cl.

CPC ................ *H02K 9/19* (2013.01); *H02K 1/26* (2013.01); *H02K 1/32* (2013.01); *H02K 3/24* (2013.01); *H02K 3/51* (2013.01); *H02K 7/1823* (2013.01); *F05D 2220/76* (2013.01); *H02K 3/50* (2013.01); *H02K 3/527* (2013.01); *H02K 5/203* (2021.01); *H02K 19/16* (2013.01); *H02K 99/10* (2016.11)

(58) Field of Classification Search

CPC ........... H02K 1/26; H02K 1/32; H02K 3/527; H02K 3/50; H02K 3/51; H02K 19/16; H02K 2220/76; H02K 99/10; H02K 7/1823; H02K 9/19; H02K 5/203

USPC ........................................................ 310/270

See application file for complete search history.

(56) References Cited

U.S. PATENT DOCUMENTS 2,712,085 A * 6/1955 Lee ......................... H02K 3/51 310/262

2,796,540 A * 6/1957 Barlow .................... H02K 3/51 310/64

(Continued)

FOREIGN PATENT DOCUMENTS

CN 103580348 A * 2/2014 ............... H02K 3/51

CN 106787579 A 5/2017

(Continued)

*Primary Examiner* — Oluseye Iwarere

*Assistant Examiner* — Daniel K Schlak

(74) *Attorney, Agent, or Firm* — Thomas | Horstemeyer, LLP

(57) ABSTRACT

A rotor assembly includes a rotor core having a rotatable shaft and defining at least one rotor post, and a winding wound around the post that defines a set of rotor winding end turns. A support assembly for the rotor winding end turns is rotatably coupled to the rotatable shaft and defines a cavity in fluid communication with a fluid coolant flow. The rotor winding end turns extend into the cavity.

15 Claims, 14 Drawing Sheets

(51) Int. Cl.
*H02K 19/16* (2006.01)
*H02K 99/00* (2014.01)
*H02K 3/50* (2006.01)

(56) References Cited

U.S. PATENT DOCUMENTS 3,048,725 A 8/1962 Wesolowski
3,189,769 A * 6/1965 Willyoung ............. H02K 9/225 310/52
3,296,470 A * 1/1967 Valentinovich .......... H02K 9/00 310/64
3,891,877 A * 6/1975 Shapiro .................... H02K 3/22 310/61
4,091,301 A * 5/1978 Blank ...................... H02K 3/51 310/262
4,143,290 A * 3/1979 Mizukami ................ H02K 3/51 310/59
4,177,398 A * 12/1979 Zagorodnaya ........... H02K 3/51 310/270
4,368,399 A * 1/1983 Ying ........................ H02K 3/51 310/260
4,486,676 A * 12/1984 Moore ................... H02K 55/04 62/505
4,967,465 A * 11/1990 Frank ....................... H02K 3/51 29/598
5,140,204 A 8/1992 Cashmore et al.
5,189,325 A 2/1993 Jarczynski
5,666,016 A * 9/1997 Cooper .................... H02K 3/24 310/59
6,157,110 A * 12/2000 Strobl ...................... H02K 3/44 310/236
6,727,609 B2 4/2004 Johnsen
6,864,617 B1 * 3/2005 Wang ....................... H02K 3/51 310/214
7,786,630 B2 8/2010 Waddell et al.
7,855,487 B2 12/2010 Lemmers, Jr. et al.
7,902,702 B2 3/2011 Hashiba
8,022,582 B2 9/2011 Dames et al.
8,115,352 B2 * 2/2012 Neje ........................ H02K 1/32 310/58
8,269,393 B2 9/2012 Patel et al.
8,575,798 B2 11/2013 Takahashi et al.
9,024,500 B2 5/2015 Kimura et al.
9,203,284 B2 12/2015 Kaiser et al.
9,614,407 B2 4/2017 Nishikawa
10,333,365 B2 6/2019 Takahashi et al.
10,554,088 B2 2/2020 Huang et al.
11,431,227 B2 8/2022 Lambourg
2005/0258708 A1 * 11/2005 Kaminiski ............. H02K 3/505 310/270
2010/0283352 A1 * 11/2010 Lemmers, Jr. ........... H02K 1/22 310/216.115
2011/0133579 A1 6/2011 Vandersyden
2012/0080967 A1 * 4/2012 Neje ........................ H02K 3/24 310/65
2012/0228973 A1 * 9/2012 Jha ........................... H02K 3/51 310/71
2013/0076171 A1 3/2013 Lepres et al.
2013/0106211 A1 * 5/2013 Holzner ................. H02K 3/527 310/194
2016/0099624 A1 * 4/2016 Himmelmann .......... H02K 3/46 310/214
2016/0149452 A1 * 5/2016 Garmon ................... H02K 1/32 310/59
2016/0211712 A1 7/2016 Patel et al.
2016/0211713 A1 7/2016 Patel et al.
2020/0106342 A1 * 4/2020 Chatterjee .............. H02K 9/193
2020/0212742 A1 * 7/2020 Sridharan ................ H02K 9/19
2021/0281135 A1 * 9/2021 Koga ....................... H02K 1/26
2023/0014443 A1 * 1/2023 Samata .................... H02K 3/51
2023/0024649 A1 1/2023 Hong et al.
2023/0208239 A1 * 6/2023 Vegini ...................... H02K 3/51 310/216.131
2023/0246495 A1 * 8/2023 Sridharan ................ H02K 3/24 310/216.069
2023/0246498 A1 * 8/2023 Chatterjee ................ H02K 1/28 310/54
2023/0246499 A1 * 8/2023 Sridharan .............. H02K 19/16 310/61
2023/0246500 A1 * 8/2023 Jia ........................... H02K 3/24 310/52
2023/0336043 A1 * 10/2023 Sridharan ................ H02K 9/19
2024/0322634 A1 * 9/2024 Gulley ..................... H02K 3/50
2026/0018950 A1 * 1/2026 Sridharan ................ H02K 1/32

FOREIGN PATENT DOCUMENTS

CN 209659087 U * 11/2019 ............... H02K 9/00
DE 102021129951 A1 * 5/2023 ............. H02K 3/527
EP 0615333 B1 6/1997
EP 3046230 A1 9/2018
EP 2568574 B1 4/2019
EP 3629449 A1 4/2020
EP 3675332 A1 7/2020
EP 4220902 A1 8/2023
EP 4220907 A1 8/2023
FR 2984034 A1 6/2013
FR 3079978 A1 10/2019
GB 164903 A * 6/1921 ............... H02K 3/51
GB 529045 A * 11/1940 ............... H02K 3/51
GB 747065 A * 3/1956 ............... H02K 3/51
WO WO-9739513 A1 * 10/1997 ............... H02K 3/24
WO 2009029743 A1 3/2009
WO 2018235969 A1 12/2018
WO 2020020551 A1 1/2020
WO 2020128888 A1 6/2020
WO 2020191167 A1 9/2020

* cited by examiner 41
42
92
92
82
90
90
85
54
14
50
18
51
92
52
84
86
80
44
40
91

METHOD AND APPARATUS FOR COOLING A ROTOR ASSEMBLY

CROSS REFERENCE TO RELATED APPLICATION

This application claims priority to Indian Provisional Application No. 202311054914, filed Aug. 16, 2023, the disclosure of which is hereby incorporated by reference in its entirety as though fully set forth herein.

BACKGROUND

Electric machines, such as electric motors or electric generators, are used in energy conversion. Such electrical machines operate through the interaction of magnetic fields, and current carrying conductors generate the force or electricity respectively. Typically, an electrical motor converts electrical energy into mechanical energy. Conversely, an electrical generator converts mechanical energy into electrical energy. For example, in the aircraft industry, it is common to combine a motor mode and a generator mode in the same electric machine, where the electric machine in motor mode functions to start the engine, and, depending on the mode, also functions as a generator.

DETAILED DESCRIPTION

Figure 1:
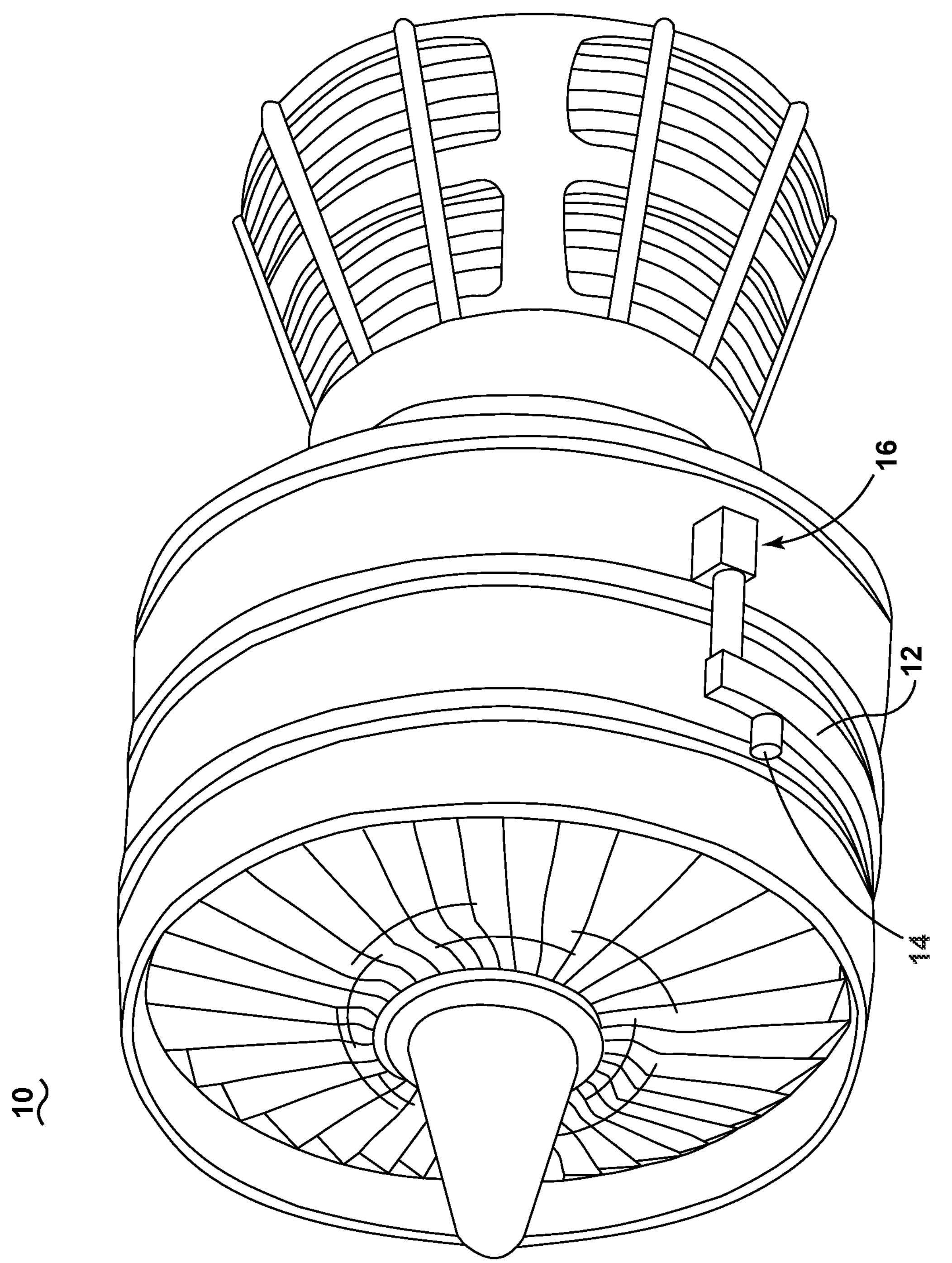
FIG. 1 is an isometric view of a gas turbine engine having a generator, in accordance with various aspects described herein.

Aspects of the disclosure can be implemented in any environment using an electric machine regardless of whether the electric machine provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

As used herein, the terms such as "first", "second", "third", and the like may be used interchangeably to distinguish one component from another and are not intended to signify location or importance of the individual components.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "wet" cavity generator includes a cavity housing the rotor and stator that is exposed to free liquid coolant (e.g., coolant freely moving within the cavity). In contrast, a "dry" cavity generator the rotor and stator can be cooled by coolant contained within limited in fluidly sealed passages (e.g., non-freely moving about the cavity).

As used herein, the term "underlie" denotes a relative position radially closer to a rotational axis of a rotatable shaft. Also as used herein, the term "overlie" denotes a relative position radially farther from the rotational axis of the rotatable shaft.

As used herein, the term "electrically insulative" refers to a material that exhibits a low electrical conductivity (for example, less than about 10-8 siemens per meter (S/m)).

Aspects of the disclosure described herein are directed to an electrical machine, and more specifically to a rotor assembly for an electrical machine. The rotor assembly, as described herein, can include a rotatable element defining a central rotational axis and defining a periphery. A set of rotor windings can be wound about the periphery. For the purposes of illustration, exemplary aspects will be described herein in the form of an electrical machine, specifically a generator, for a gas turbine engine and having a rotor assembly. It will be appreciated, however, that the electrical machine can be in the form of a generator, a motor, a permanent magnet generator (PMG), or a starter/generator (S/G), and the like, in non-limiting examples. It will be further understood, however, that aspects of the disclosure described herein are not so limited and can have general applicability within other electrical machines or systems. For example, the disclosure can have applicability for systems in other engines or vehicles, and may be used to provide benefits in industrial, commercial, and residential applications.

For example, conventional wound-rotor generators, are a major source of electrical energy for industrial and commercial applications. They are commonly used to convert the mechanical power output of steam turbines, gas turbines, reciprocating engines and hydro turbines into electrical power. Typically, these electrical machines include a central rotatable assembly or "rotor" that is circumscribed by a stationary assembly or "stator". A small air gap separates the rotor and stator. The rotor includes a rotatable shaft and a "rotor core" having one or more sets of conductive rotor windings. The rotor windings can be axially wound around a set of posts or rotor teeth defining slots therebetween. The number of sets of rotor windings typically define the number of electrical phases of the electrical machine. A portion of the windings (e.g., an end turn portion) of conventional rotors typically extend past or overhang the rotor. The rotor winding end turns in some electric machines are supported and/or covered by a housing, cover, or other structure. In some cases, the rotor core can be oil cooled.

In operation, the rotor core of conventional electric machines, such as motors, generators, and the like, is driven to rotate by a source of rotation, such as a mechanical or electrical machine, which for some aircraft may be a gas turbine engine. The rotors are often rotated at relatively high revolutions per minute (rpm) (e.g., 20,000-500,000 rpm).

Due to the relatively linear relation between rotational speed and shaft power of an electrical machine, increasing the rated speed of a generator can boost the power density and efficiency of the generator. Accordingly, there is a growing demand for conventional electric machines, such as generators, to operate at increasingly higher speeds. However, due to the high rotational speeds, relatively large centrifugal and axial forces can be imposed upon the generator, and particularly the rotor windings. The repeated application of strong centrifugal forces and vibrations under normal operation can weaken or break the rotor windings over time.

Consequently, rotors typically require rugged construction to tolerate such forces over long periods of time, and despite this rugged construction, such rotors typically need to remain balanced to minimize vibration of the rotor windings, to reduce the risk of failures associated with improper balancing and deflection or relative movement of the rotor windings at high rotational speeds.

Additionally, conventional rotor end windings support structures are typically not continuous in the winding end turn region, with open areas or gaps within or between supporting elements. At higher rotational speeds, such discontinuous architectures in the winding end turn support structures can result in windage losses. Windage losses limit or reduce the operating efficiency of the generator, resulting in a need for additional oil cooling or a reduction in operating speed.

Thus, there is a need for a high-speed electrical machine having improved rotor winding end turn retention and support, while reducing windage losses. For example, there is a need for a rotor core having an improved rotor winding end turn support structure in order to improve the dynamic balance of the rotor core, reduce deflection or relative movement of the rotor winding end turns, and reduce windage losses, while enabling easier, lower cost assembly than conventional arrangements.

Furthermore, heat is generated in the rotor due to the flow of current through the windings, and changing magnetic fields present in the rotor, causing the temperature to rise in the rotor. It is desirable to cool the rotor to protect the electrical machine from heat related damage and to increase the electrical machine power density to allow for more power from a smaller physically sized electric motor.

The exemplary drawings are for purposes of illustration only and the dimensions, positions, order, and relative sizes reflected in the drawings attached hereto can vary.

FIG. 1 illustrates a gas turbine engine 10 having an accessory gear box (AGB) 12 and an electrical machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein. While a generator 14 is shown and described, aspects of the disclosure are not so limited, and aspects can include any electrical machine, such as, without limitation, a motor, or generator.

Figure 2:
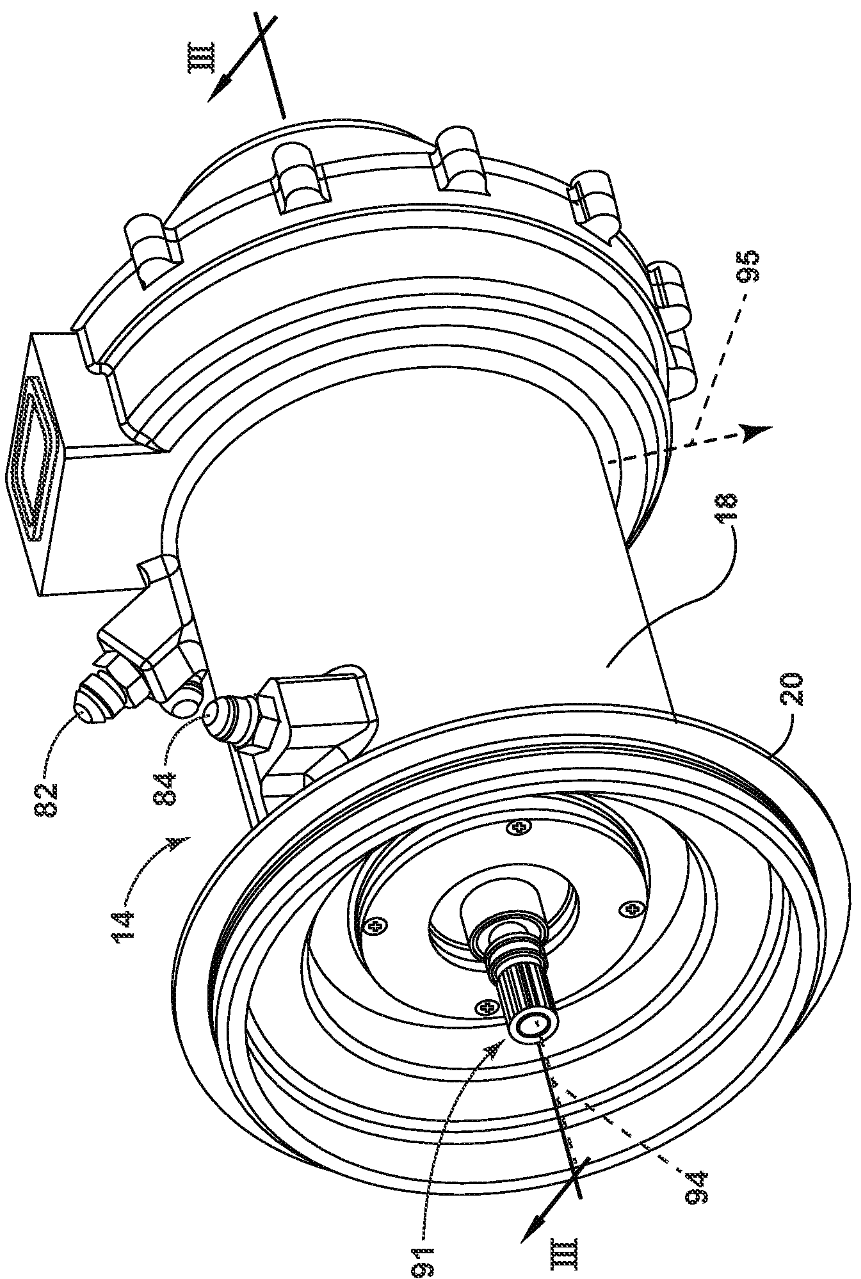
FIG. 2 is an isometric view of an exterior of the generator of FIG. 1, in accordance with various aspects described herein.

FIG. 2 more clearly illustrates a non-limiting example of generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet port 82 and cooling fluid outlet port 84 can be utilized for cooling at least a portion of a rotor or stator of the generator 14. The liquid cooling system can also include a second coolant outlet port 91, shown at a rotatable shaft portion of the generator 14. Optionally, by way of non-limiting example, the liquid cooling system can include a rotatable shaft coolant inlet port 94 or a generator coolant outlet port 95. While not shown, aspects of the disclosure can further include other liquid cooling system components, such as a liquid coolant reservoir fluidly coupled with the cooling fluid inlet port 82, the rotatable shaft coolant inlet port 94, the cooling fluid outlet port 84, or the generator coolant outlet port 95, and a liquid coolant pump (not shown) to forcibly supply the coolant through the ports 82, 84, 94, 95 or generator 14.

Figure 3:
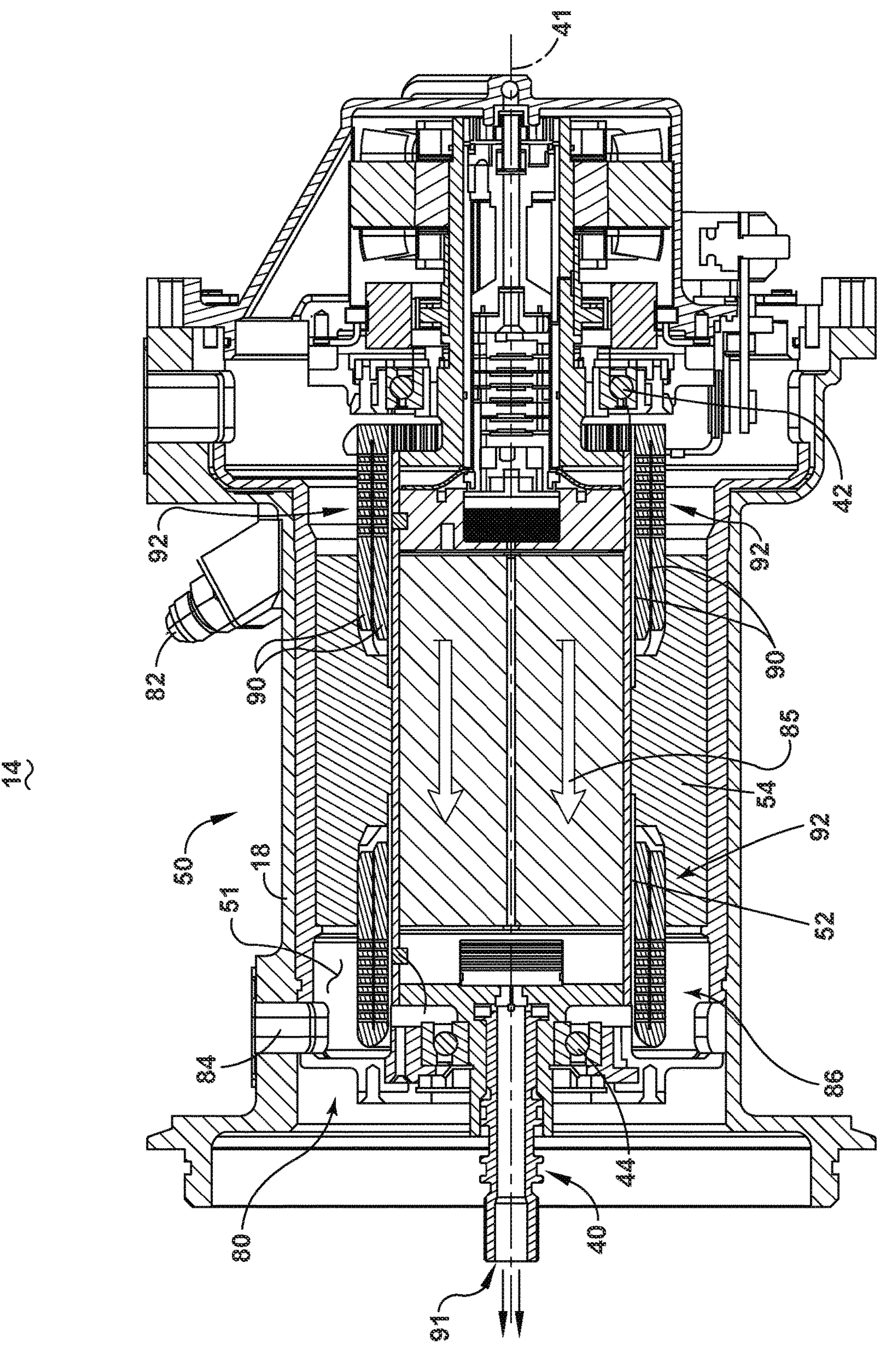
FIG. 3 is a schematic cross-sectional view of the generator of FIG. 2, taken along line III-III of FIG. 2, in accordance with various aspects described herein.

A non-limiting interior of the generator 14 is illustrated in FIG. 3, which is a cross-sectional view of the generator 14 shown in FIG. 2 taken along line III-III. A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include an electrical machine 50, housed within a cavity 51. The rotating component can comprise a rotor 52, and the corresponding fixed component comprises a stator 54 or stator core. In this manner, the rotor 52 is disposed on and co-rotates with the rotatable shaft 40. The fixed components can be mounted to any suitable part of the housing 18. Collectively, the fixed components define an interior through which the rotatable shaft 40 extends and rotates relative thereto.

It will be understood that the rotor 52 can have a set of rotor poles, and that the stator 54, can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a rotor winding or coil, with the rotor winding having at least one winding end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a stator 54.

The components of the generator 14 can be any combination of known generators. For example, the 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the generator 14 can use a cooling fluid, such as oil, as a coolant, and thus can include a cooling system 80. The cooling fluid or oil can be used to dissipate heat generated by the electrical and mechanical functions of the generator 14. The cooling system 80 using a cooling fluid can also provide for lubrication of the generator 14. In the illustrated aspects, the generator 14 can be an oil-cooled, wet cavity type cooling system 80 including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more channels or paths for coolant or fluid coolant flow 85 (shown schematically as arrows) for the rotor 52, as well as the second coolant outlet port 91, wherein residual, unused, or unspent oil can be discharged from the rotatable shaft 40.

In non-limiting examples of the generator 14, the fluid coolant flow 85 can further be directed, exposed, sprayed, or otherwise deposited onto the set of stator windings 90, the set of stator winding end turns 92, or onto alternative or additional components. In this example, the fluid coolant flow 85 can flow from the rotatable shaft 40 radially outward toward the set of stator windings 90 or the set of stator winding end turns 92. In this sense, the coolant can cool the respective set of stator windings 90 or set of stator winding end turns 92.

Figure 4:
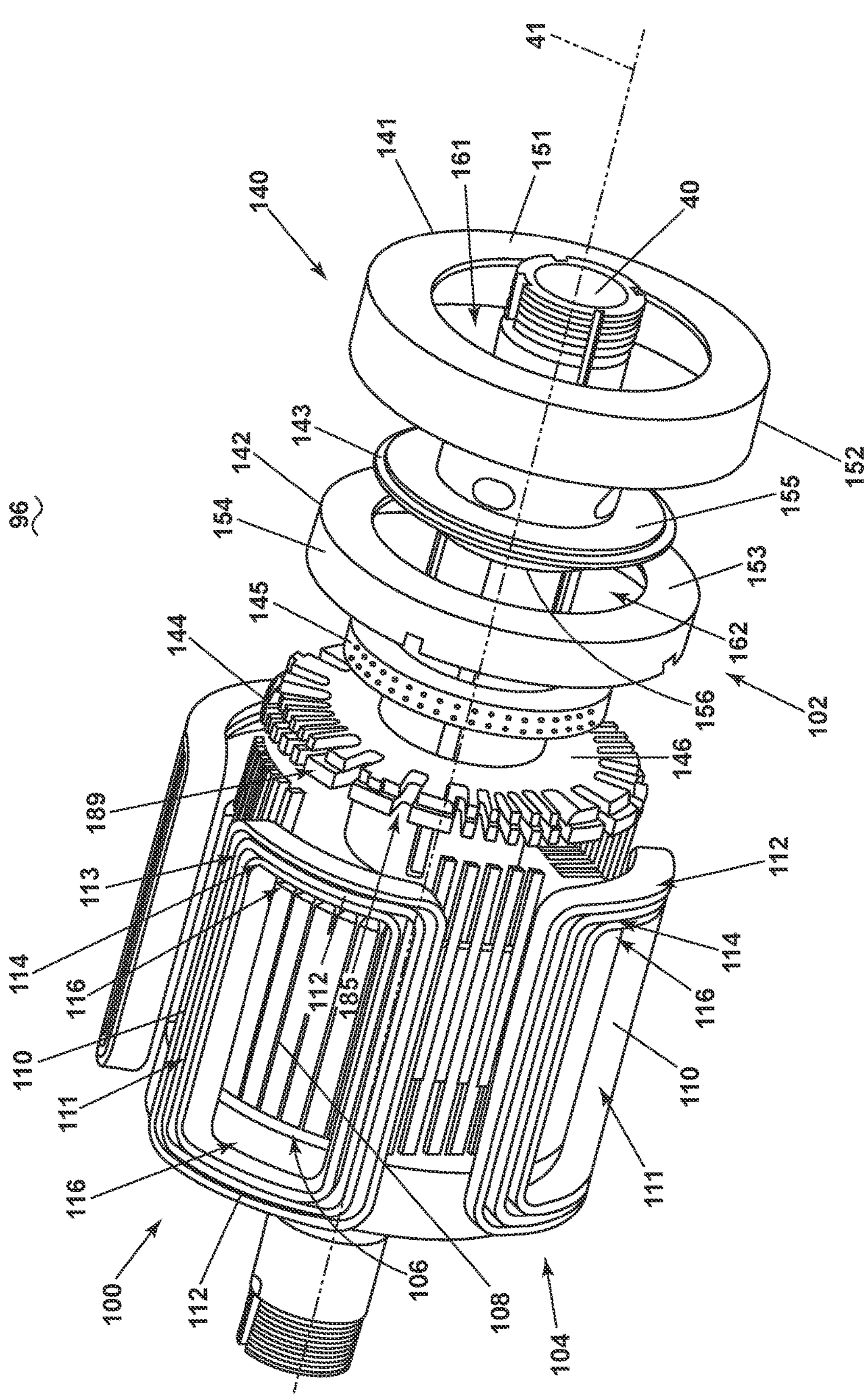
FIG. 4 illustrates a partially exploded perspective view of a rotor core and end winding support assembly for the generator of FIG. 3, in accordance with various aspects described herein.

FIG. 4 illustrates a partially exploded perspective view of a rotor assembly 96 such as for a main electrodynamic machine, with some parts omitted for clarity. As shown, the rotor assembly 96 can include a rotor core 100, such as a laminated rotor core 100, rotatably connected to co-rotate with the rotatable shaft 40 about the rotational axis 41. The rotor assembly 96 can include at least one end winding support assembly 140. The end winding support assembly 140 is coupled to the rotatable shaft 40 for rotation therewith. Each end winding support assembly 140 can respectively include a first collar 141, a second collar 142, a coupling disc 143, and a support disc 144, respectively. In non-limiting aspects, the end winding support assembly 140 can include a coolant distribution ring 145. Further, in still other aspects, the end winding support assembly can include a spacer disc 146. The first collar 141 can include a first wall 151 and a second wall 152. The second collar 142 can include a third wall 253 and a fourth wall 254. The coupling disc 143 can include a fifth wall 155 and a sixth wall 156. In various aspects, each of the first, second, third, fourth, fifth, and sixth walls 151-156 can be annular.

The rotor assembly 96 can further define an axial first end 102 and an axial second end 104, axially spaced from the first end 102. The rotor assembly 96 can include at least one rotor pole 106 defined by a rotor post 108 and formed when at least a portion of the rotor core 100 is wound with one or more sets of conductive rotor wiring or rotor windings 110 or coils about a respective rotor post 108. In the illustration of FIG. 4, an aspect having four rotor poles 106 is shown, with three rotor poles 106 being visible in the illustration. Other aspects are not so limited, and rotor assembly 96 can alternatively have fewer than four rotor poles 106, or more than four rotor poles 106, without departing from the scope of the disclosure, and aspects can be adapted to rotor assemblies 96 having any desired number of rotor poles 106.

The rotor windings 110 wound around the rotor post 108 can define a respective axial winding portion 111 extending axially along the rotor core 100, and respective rotor winding end turns 112 extending axially beyond the rotor core 100. In the perspective of the illustrated example, each rotor post 108 can radially underlie a respective set of rotor windings 110. While the rotor windings 110 or the rotor winding end turns 112 can refer to a set of or plural windings or end turns, an end turn can include only one of the set of rotor windings 110, or only one portion of the set of rotor windings 110 extending axially beyond the rotor core 100, such as only at the first end 102 or the second end 104.

Each set of rotor winding end turns 112 can define a respective loop or arcuate bight portion 113 overhanging or extending axially beyond the rotor core 100. In non-limiting aspects, each bight portion 113 can further define a respective channel 116 extending radially therethrough. For example, in non-limiting aspects each channel 116 can have a respective circumferential width defined by a circumferential width of corresponding rotor post 108. Additionally, a set of radially extending end turn passages 114 can be defined by gaps formed between immediately adjacent rotor winding end turns 112. The rotor end turn passages 114 are arranged in fluid communication with the second collar 142 and the support disc 144.

While a substantially rectangular rotor winding 110 cross section is illustrated, any geometric cross section can be included in aspects of the disclosure, including by not limited to circular, ovate, square, and the like. Non-limiting aspects of the disclosure can also be included wherein the set of rotor windings 110 includes a layer of electrically insulating material (not shown) external to, and enveloping the set of rotor windings 110, to electrically isolate the set of rotor windings 110 from another set of rotor windings 110 and nearby conductive parts.

A respective end winding support assembly 140 can be coupled to each end of the rotatable shaft 40 of the rotor assembly 96 such that a rotation of the rotatable shaft 40 causes a rotation of the end winding support assemblies 140. In non-limiting aspects, a respective end winding support assembly 140 can be coupled to an end (e.g., either the first end 102 or the second end 104) of the rotor assembly 96. In other aspects, a respective end winding support assembly 140 can be rotatably coupled to the rotatable shaft 40 at both the first end 102 and the second end 104 of the rotor assembly 96.

The first wall 151 can be arranged facing an end 102, 104 of the rotor core 100 and can define a first bore 161. The second wall 152 can be coupled to the first wall 151 and extend axially inward therefrom toward the rotor core 100. The second wall 152 is arranged to radially overlie a rotor winding end turn 112 of the rotor windings relative to the rotational axis 41 of the rotatable shaft 40.

The second collar 142 can be disposed between the first collar 141 and the rotor core 100. The third wall 253 can be arranged confronting or facing an end 102, 104 the rotor core 100 and can define a second bore 162. The fourth wall 254 can be coupled to the third wall 253 and extend axially inward therefrom toward the rotor core 100. The fourth wall 254 is radially disposed between the rotor winding end turns 112 and the second wall 152 of the first collar 141. In non-limiting aspects, the fourth wall 254 can be further arranged to radially overlie a rotor winding end turn 112 relative to the rotational axis 41 of the rotatable shaft 40.

The coupling disc 143 fifth wall 155 is arranged confronting or facing a respective end 102, 104 of the rotor core 100. The sixth wall 156 is coupled to the fifth wall 155 and extends axially therefrom toward the rotor core 100. The sixth wall 156 can circumferentially surround and be coupled to the rotatable shaft 40.

The support disc 144 can circumferentially surround and be coupled to the rotatable shaft 40. In non-limiting aspects, the support disc 144 can be disposed between the rotor core 100 and the second collar 142. In some aspects, the support disc 144 can include a radially outer periphery 189. In non-limiting aspects, the radially outer periphery 189 can define a set of first slots 185 or gaps therethrough. The first slots 185 can be circumferentially spaced from each other about the support disc 144. The first slots 185 can be sized to operatively receive a respective rotor winding 110 axially therein. In non-limiting aspects, a portion of the support disc 144 can be disposed within one or more of the channels 116 defined by the rotor winding end turns 112, with the rotor winding end turns 112 disposed in a respective first slot While FIG. 4 depicts a non-limiting example of the end winding support assembly 140 configured for a 4-pole rotor assembly 96, other aspects are not so limited. It will be appreciated that aspects as disclosed herein are not limited to any specific number of rotor poles, and aspects of end winding support assembly 140 can be adapted to rotor assemblies 96 having any desired number of poles.

Figure 5:
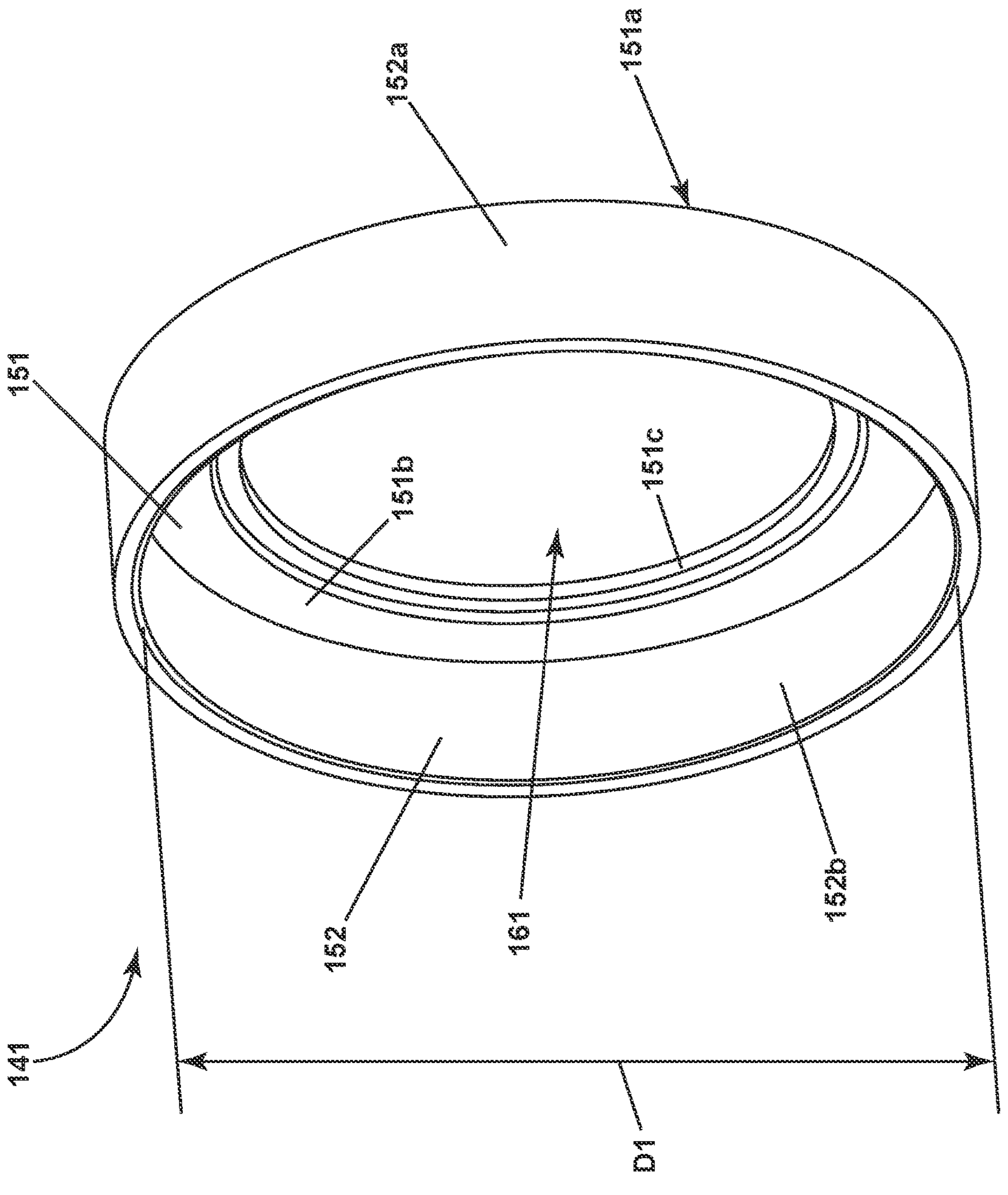
FIG. 5 is a perspective view of a first collar of the end winding support assembly of FIG. 4, in accordance with various aspects described herein.

FIG. 5 depicts a perspective view of the first collar 141 of FIG. 4. In non-limiting aspects, the first wall 151 can define an axially inward-facing (e.g., facing toward the rotor core 100 of FIG. 4) annular first surface 151*a* and an opposing axially outward-facing (e.g., facing away from the rotor core 100 of FIG. 4) annular second surface 151*b*. The first wall 151 can further include a radially inward-facing annular third surface 151*c* defining the first bore 161. The third surface 151*c* can extend from the first surface 151*a* to the second surface 151*b*. The first bore 161 can be sized to receive the rotatable shaft 40 therethrough. The second wall 152 can have a radially inward-facing (e.g., toward the rotor core 100 of FIG. 4) annular fourth surface 152*a* and an opposing radially outward-facing (e.g., away from the rotor core 100 of FIG. 4) annular fifth surface 152*b*. The fifth surface 152*b* can define a first diameter D1.

Figure 6:
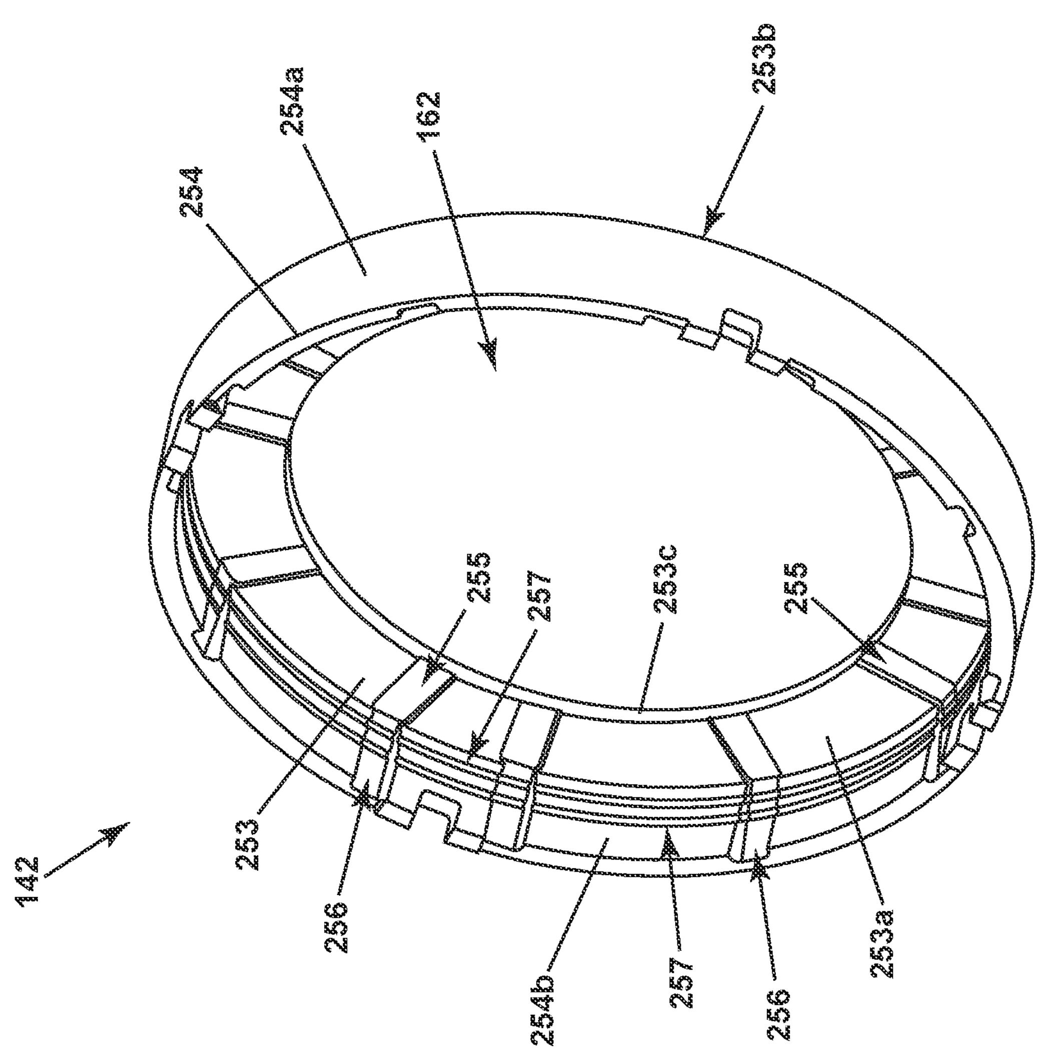
FIG. 6 is a perspective view of a second collar of the end winding support assembly of FIG. 4, in accordance with various aspects described herein.

FIG. 6 depicts a perspective view of the second collar 142 of FIG. 4. In non-limiting aspects, the second collar 142 is electrically insulative. The third wall 253 can define an axially-inward-facing annular sixth surface 253*a* (e.g., facing toward the rotor core 100 of FIG. 4) and an opposing axially outward-facing annular seventh surface 253*b* (e.g., facing away from the rotor core 100 of FIG. 4). The third wall 253 can further include a radially inward-facing annular eighth surface 253*c* defining the second bore 162. The eighth surface 253*c* can extend axially from the sixth surface 253*a* to the seventh surface 253*b*. The second bore 162 can be sized to receive the rotatable shaft 40 therethrough. The fourth wall 254 can have a radially outward-facing ninth surface 254*a* (e.g., facing away from the rotor core 100 shown in FIG. 4) and an opposing radially inward-facing tenth surface 254*b* (e.g., facing toward the rotor core 100).

In non-limiting aspects, the sixth surface 253*a* of the third wall 253 can define a set of first grooves 255 thereon. The first grooves 255 can have a circumferential width and extend radially across the sixth surface 253*a*, for example extending from the eighth surface 253*c* to ninth surface 254*a* of the fourth wall 254. The first grooves 255 are circumferentially spaced from each other.

The tenth surface 254*b* of the fourth wall 254 can define a set of second grooves 256. The second grooves 256 can be arranged in fluid communication with the set of first grooves 255. The second grooves 256 have a circumferential width and can extend axially across the tenth surface 254*b*, for example extending from the sixth surface 253*a* to an opposing end at an axial extent of the fourth wall 254. The second grooves 256 are circumferentially spaced from each other. In non-limiting aspects, the second grooves 256 can be tapered. For example, one or more of the second grooves 256 can be shallower at the tenth surface 254*b* than at the diametric end at the radial extent of the fourth wall 254. The first and second grooves 255, 256 can define coolant collection surfaces.

Additionally, or alternatively, the tenth surface 254*b* of the fourth wall 254 can define a set of third grooves 257. The third grooves 257 have an axial width and extend circumferentially along the tenth surface 254*b*. The third grooves 257 are axially spaced from each other. The third grooves 257 can be arranged in fluid communication with the set of second grooves 256, or the set of first grooves 255, or both. In non-limiting aspects, the third grooves 257 and second grooves 256 are arranged at an angle with respect to each other. For example, as illustrated, in some aspects, the third grooves 257 can be arranged orthogonally with respect to the second grooves 256. In other aspects the third grooves 257 can be arranged at any desired angle (e.g., non-parallel) with respect to the second grooves 256. The third grooves 257 can define coolant collection surfaces.

Figure 7A:
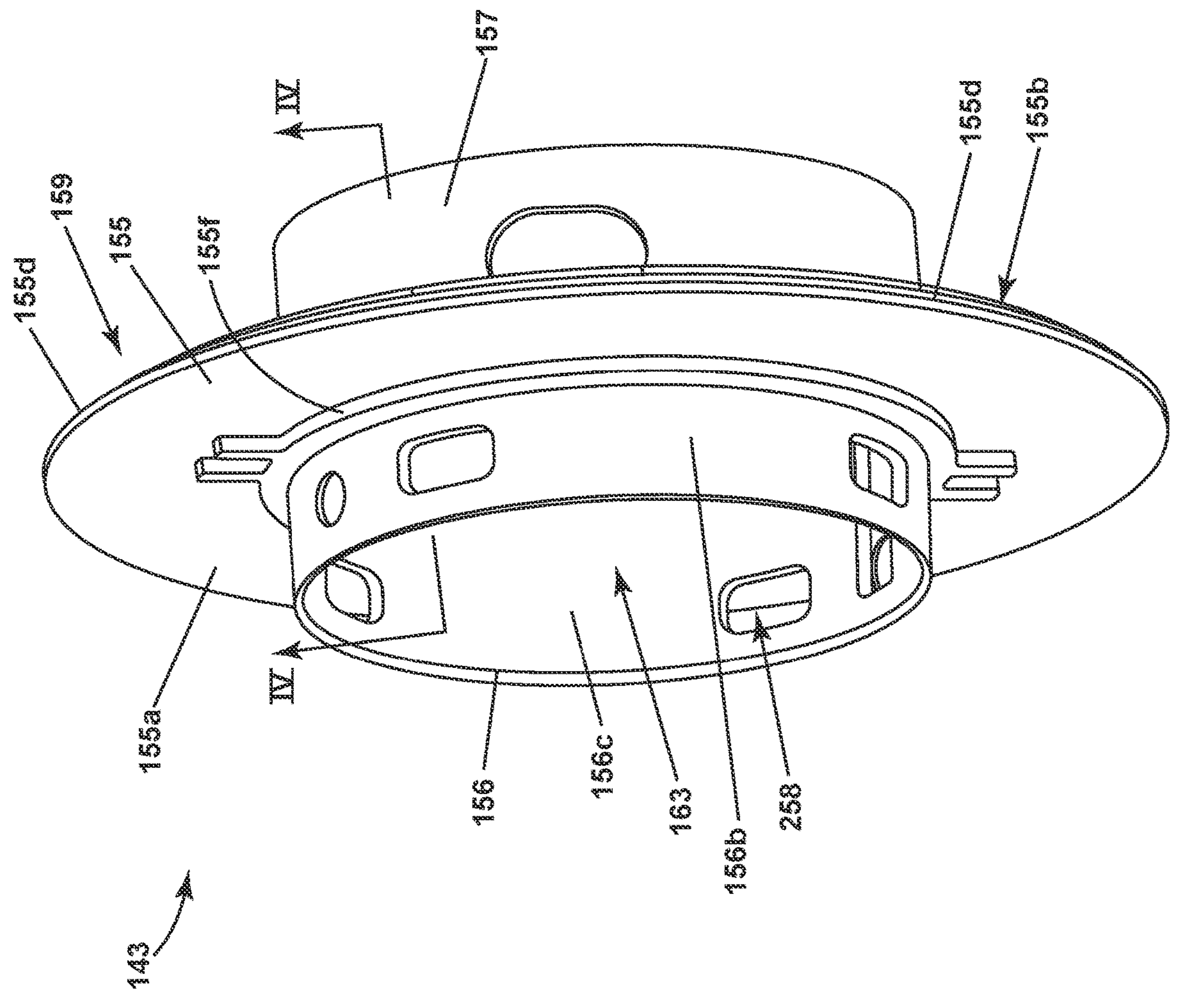
FIG. 7A is a perspective view of a coupling disc of the end winding support assembly of FIG. 4, in accordance with various aspects described herein.
Figure 7B:
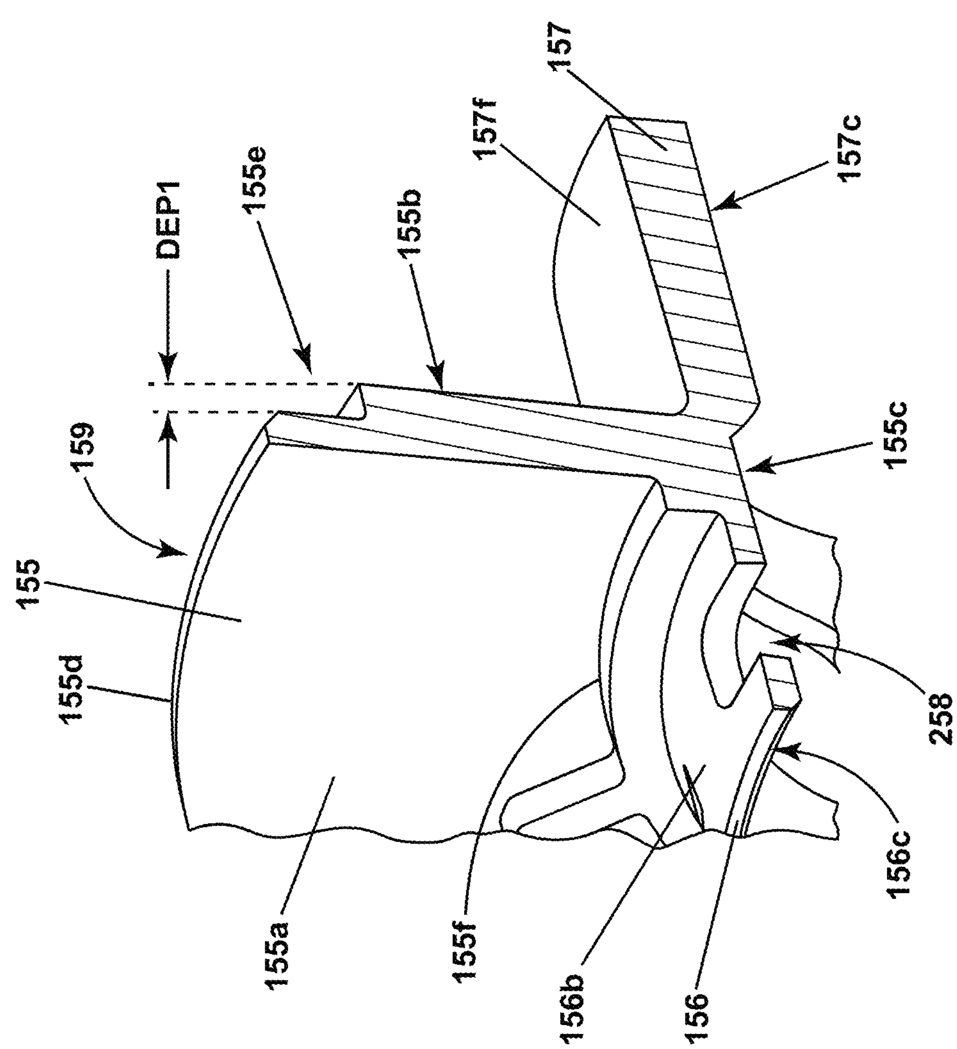
FIG. 7B illustrates a cross section of a portion of the coupling disc of FIG. 7, in accordance with various aspects described herein.

FIG. 7A depicts a more detailed perspective view of the coupling disc 143 of FIG. 4, and FIG. 7B is a cross-section of a portion of the coupling disc 143 of FIG. 7A taken along line IV-IV. With simultaneous reference to FIGS. 7 and 7A, the fifth wall 155 and sixth wall 156 can cooperatively define a third bore 163 sized to receive the rotatable shaft 40 therethrough. For example, the fifth wall 155 can define an axially inward-facing eleventh surface 155*a* (e.g., facing axially toward the rotor core 100 of FIG. 4) and an opposing axially outward-facing twelfth surface 155*b* (e.g., facing axially away from the rotor core 100 of FIG. 4). The fifth wall 155 can further include a radially inward-facing thirteenth surface 155*c* (e.g., facing radially toward the rotor core 100 of FIG. 4) and an opposing radially outward-facing fourteenth surface 155*d* (e.g., facing radially away from the rotor core 100 of FIG. 4). The fourteenth surface 155*d* can define a radially outer periphery 159 of the coupling disc 143. The radially inward-facing thirteenth surface 155*c* can define a third bore 163. The thirteenth surface 155*c* can extend from the eleventh surface 155*a* to the twelfth surface 155*b*.

In non-limiting aspects, the twelfth surface 155*b* can define a recess 155*e* or seat portion defined thereon. The recess 155*e* can be annular and arranged along the radially outer periphery 159 of the coupling disc 143 (e.g., on the twelfth surface 155*b*). The recess 155*e* can be recessed from an adjacent or abutting portion of the twelfth surface 155*b* by a depth DEP1. The depth DEP1 can be based on a thickness of the first wall 151 of the first collar 141 (shown in FIG. 5). The recess 155*e* or seat portion can provide a seating surface for the first wall 151.

In some non-limiting aspects, the coupling disc 143 can define a lip 155*f*. The lip 155*f* can be coupled to the eleventh surface 155*a* and extend axially therefrom. The lip 155*f* is arranged to confront the eighth surface 253*c* of the second collar 142 (shown in FIG. 6). The lip 155*f* can be annular and arranged to circumferentially surround the third bore 163.

The sixth wall 156 can extend axially inward (e.g., axially toward the rotor core 100 of FIG. 4) from the eleventh surface 155*a*. The sixth wall 156 can include an annular radially inward-facing fifteenth surface 156*c* and an opposing annular radially outward-facing sixteenth surface 156*b*. The sixth wall 156 can define a set of apertures 258 therethrough. The apertures 258 can extend from the fifteenth surface 156*c* to the sixteenth surface 156*b*. In non-limiting aspects, the apertures 258 can be circumferentially spaced from each other about the sixth wall 156. The sixth wall 156 can cooperate with the radially inward-facing thirteenth surface 155*c* to further define the third bore 163. The fifteenth surface 156*c* can be concentrically aligned with the thirteenth surface 155*c* of the fifth wall 155. The fifteenth surface 156*c*, or the thirteenth surface 155*c*, or both can define the third bore 163.

In non-limiting aspects, the coupling disc 143 can further include an annular seventh wall 157. The seventh wall 157 can circumferentially surround the rotatable shaft 40. The seventh wall 157 can be coupled to the twelfth surface 155*b* and extend axially outward therefrom (e.g., facing away from the rotor core 100 of FIG. 4). The seventh wall 157 can cooperate with the fifteenth surface 156*c*, or the thirteenth surface 155*c*, or both to further define the third bore 163. For example, the seventh wall 157 can include an annular radially inward-facing seventeenth surface 157*c* and an opposing annular radially outward-facing eighteenth surface 157*f*. The seventeenth surface 157*c* can be concentrically aligned with the thirteenth surface 155*c* of the fifth wall 155.

Figure 8:
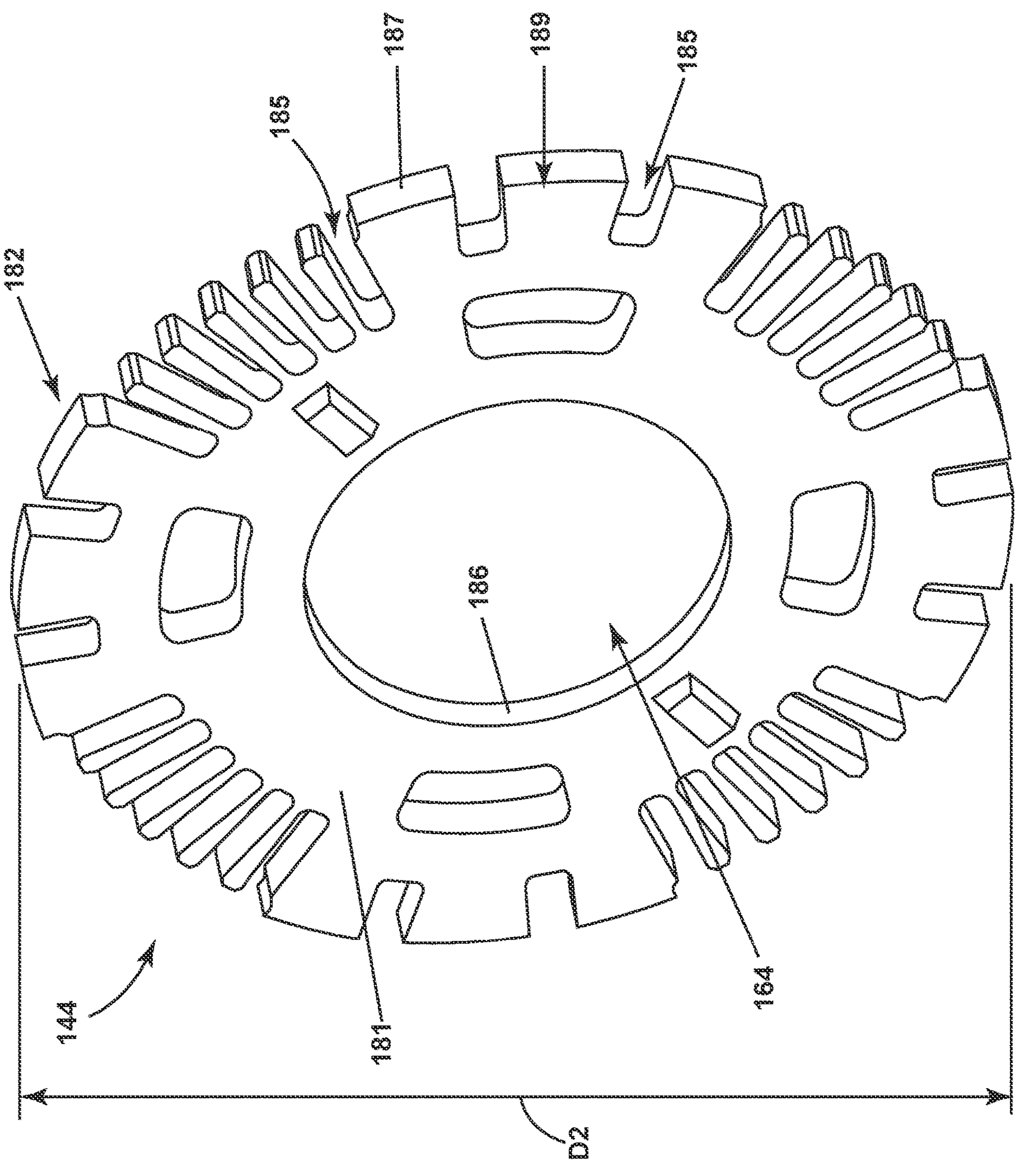
FIG. 8 is a perspective view of a support disc of the end winding support assembly of FIG. 4, in accordance with various aspects described herein.

FIG. 8 depicts a non-limiting aspect of the support disc 144. In non-limiting aspects, the support disc 144 can comprise an annular disc having a first face 181 and an opposing second face 182. The first face 181 can be arranged facing or confronting an end 102, 104 of the rotor core 100 (shown in FIG. 4). In aspects, the second face 182 can be axially outward-facing, (e.g., facing axially away from the rotor core 100 of FIG. 4). The support disc 144 can define a fourth bore 164 sized to receive the rotatable shaft 40 (shown in FIG. 4) therethrough. For example, the support disc 144 can comprise a radially inward-facing, nineteenth surface 186 (e.g., facing toward the rotatable shaft 40 of FIG. 4). The support disc 144 can include a radially outwardly facing, twentieth surface 187 that opposes the nineteenth surface 186. The twentieth surface 187 can define a second diameter D2. In non-limiting aspects, the twentieth surface 187 can define the radially outer periphery 189. The nineteenth and twentieth surfaces 186, 187 can extend axially between the first face 181 and second face 182. In non-limiting aspects, the twentieth surface 187 can define the set of first slots 185 or gaps therethrough. The first slots 185 can be circumferentially spaced from each other about the radially outer periphery 189 of the support disc 144.

Figures 9A, 9B:
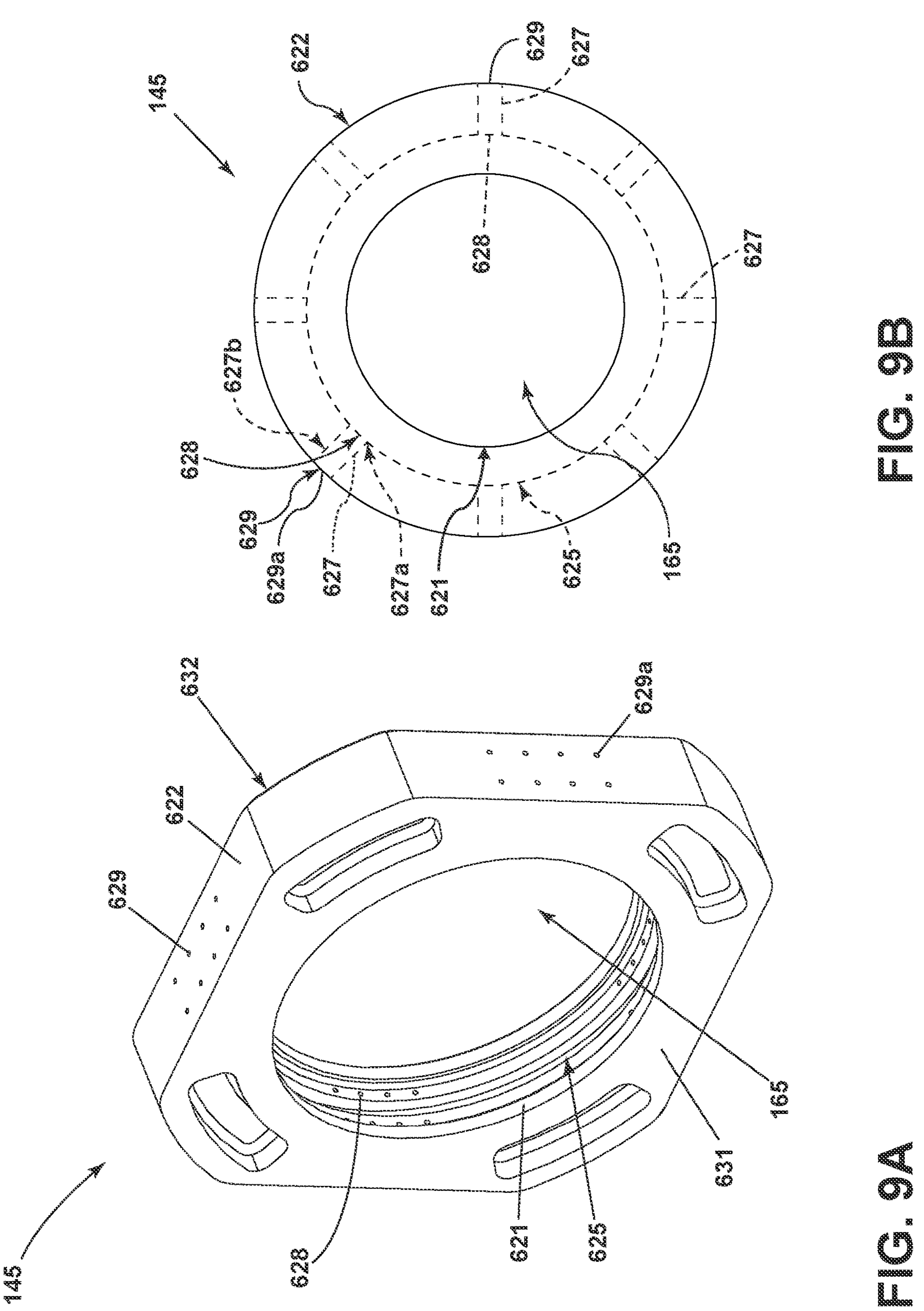
FIG. 9A is a perspective view of a coolant distribution ring of the end winding support assembly of FIG. 4, in accordance with various aspects described herein.
FIG. 9B is a perspective front view of another non-limiting aspect of the coolant distribution ring in accordance with various aspects as described herein.

FIG. 9A depicts a perspective view of a non-limiting aspect of the coolant distribution ring 145, and FIG. 9B depicts a cross section of another aspect of the coolant distribution ring 145. With simultaneous reference to FIGS. 9 and 9A, in non-limiting aspects, the coolant distribution ring 145 can comprise an annular disc having a third face 631 and an opposing fourth face 632. The third face 631 can be arranged facing an end 102, 104 of the rotor core 100 (shown in FIG. 4), and the fourth face 632 can be axially outward-facing, (e.g., facing axially away from the rotor core 100 of FIG. 4). The coolant distribution ring 145 can comprise a radially inward-facing, twenty-first surface 621 (e.g., facing toward the rotatable shaft 40 of FIG. 4). The twenty-first surface 621 can define a fifth bore 165 sized to receive the rotatable shaft 40 (shown in FIG. 4) therethrough. The coolant distribution ring 145 can include a radially outwardly facing, twenty-second surface 622 opposing the twenty-first surface 621. In non-limiting aspects, the twenty-second surface 622 can be an outer perimetric surface. The twenty-first surface 621 and twenty-second surface 622 can axially extend between the third face 631 and fourth face 632.

In some aspects, the twenty-first surface 621 can be a relatively smooth surface. In other non-limiting aspects, the twenty-first surface 621 can define a set of channels or fourth grooves 625 thereon. When assembled, the fourth grooves 625 can be arranged in fluid communication with the rotatable shaft 40 (FIG. 4). As such the set of fourth grooves 625 can cooperatively define a coolant reservoir.

The coolant distribution ring 145 can further define a set of channels 627 extending radially therethrough in fluid communication with the twenty-first surface 621. For example, the channels 627 can extend from a first end 627*a* disposed at the twenty-first surface 621 to an opposing second end 627*b* at the twenty-second surface 622. Each channel 627 can comprise a coolant inlet 628 defined on the twenty-first surface 621, and a corresponding coolant outlet 629 defined on the twenty-second surface 622, at the opposing second end 627*b*.

The channels 627 can be circumferentially spaced about the coolant distribution ring 145. The channels 627 can be sized to allow the fluid coolant flow 85 (not shown) therethrough. In non-limiting aspects, the channels 627 can further be in fluid communication with a respective coolant outlet 629. At least a subset of the coolant outlets 629 can define a respective spray nozzle 629*a* at a radially distal end. The spray nozzles 629*a* can be disposed at circumferentially spaced intervals on the twenty-second surface 622.

Figure 10:
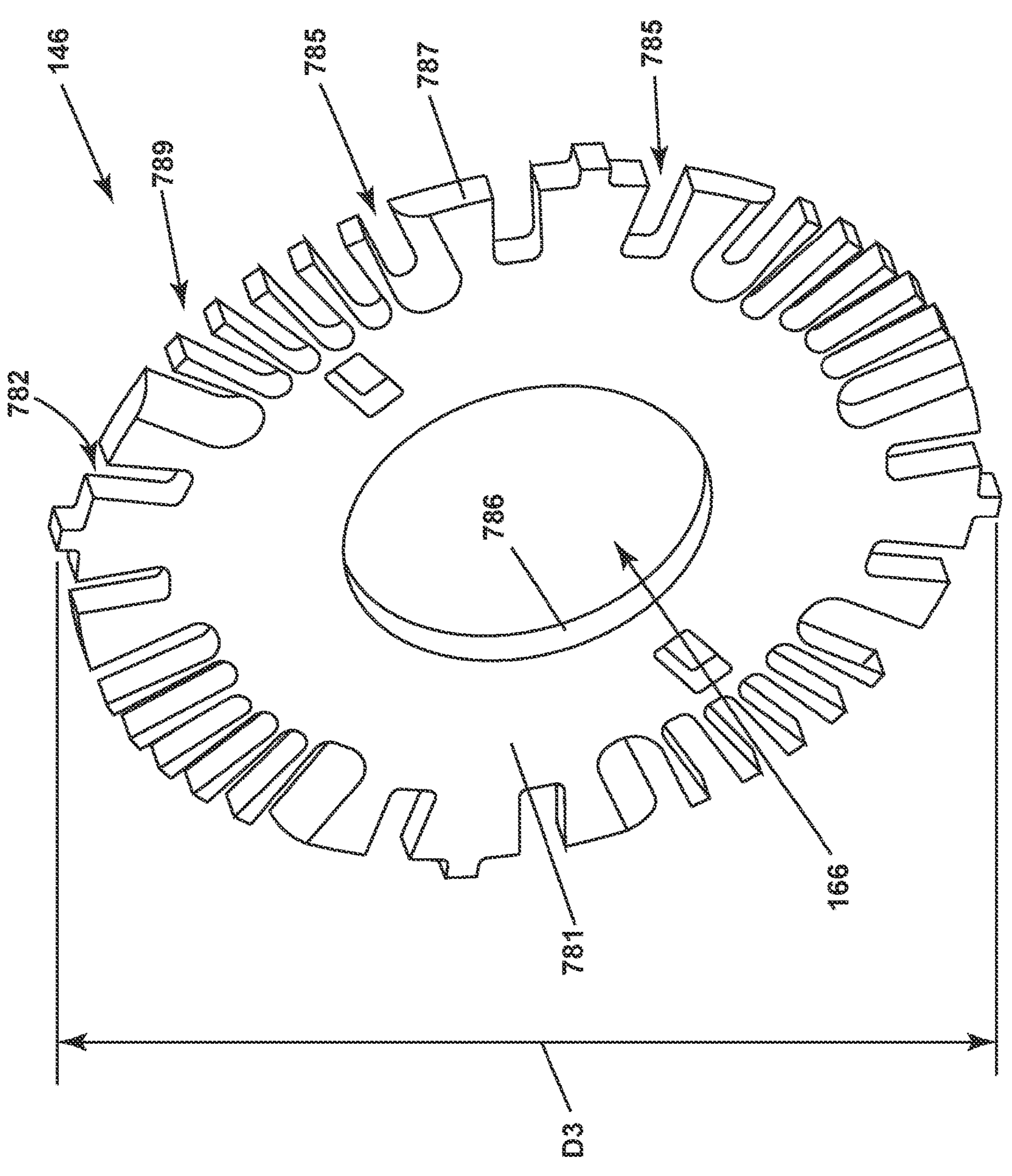
FIG. 10 is a perspective view of a spacer disc of the end winding support assembly of FIG. 4, in accordance with various aspects described herein.

FIG. 10 depicts a perspective view of a non-limiting aspect of the spacer disc 146. In non-limiting aspects, the spacer disc 146 can comprise an annular disc having a first face 781 and an opposing second face 782. In non-limiting aspects, the spacer disc 146 can be formed from an electrically insulative material. For example, the spacer disc 146 can electrically insulate the support disc from the coolant distribution ring 145 or other electrically conductive parts. In other non-limiting aspects, a radially outer surface of the spacer disc 146 can be coated with an electrically insulative material.

The first face 781 can be arranged facing an end 102, 104 of the rotor core 100 (shown in FIG. 4). In aspects, the second face 182 can be axially outward-facing, (e.g., facing axially away from the rotor core 100 of FIG. 4). The spacer disc 146 can define a sixth bore 166 sized to receive the rotatable shaft 40 (shown in FIG. 4) therethrough. For example, the spacer disc 146 can comprise a radially inward-facing, twenty-third surface 786 (e.g., facing toward the rotatable shaft 40 of FIG. 4). The spacer disc 146 can include a radially outwardly facing, twenty-fourth surface 787 that opposes the twenty-third surface 786. The twenty-fourth surface 787 can define a third diameter D3. In non-limiting aspects, the third diameter D3 is less than the second diameter D2 of the support disc 144 (shown in FIG. 8).

In non-limiting aspects, the twenty-fourth surface 787 can define a radially outer periphery 789 of the spacer disc 146. The twenty-third and twenty-fourth surfaces 786, 787 can axially extend between the first face 781 and second face 782. In non-limiting aspects, the twenty-fourth surface 787 can define a set of second slots 785 or gaps therethrough. The second slots 785 can be circumferentially spaced from each other about the radially outer periphery 789 of the spacer disc 146. The second slots 785 can be sized to operatively receive a respective rotor winding 110 axially therein.

Figure 11B:
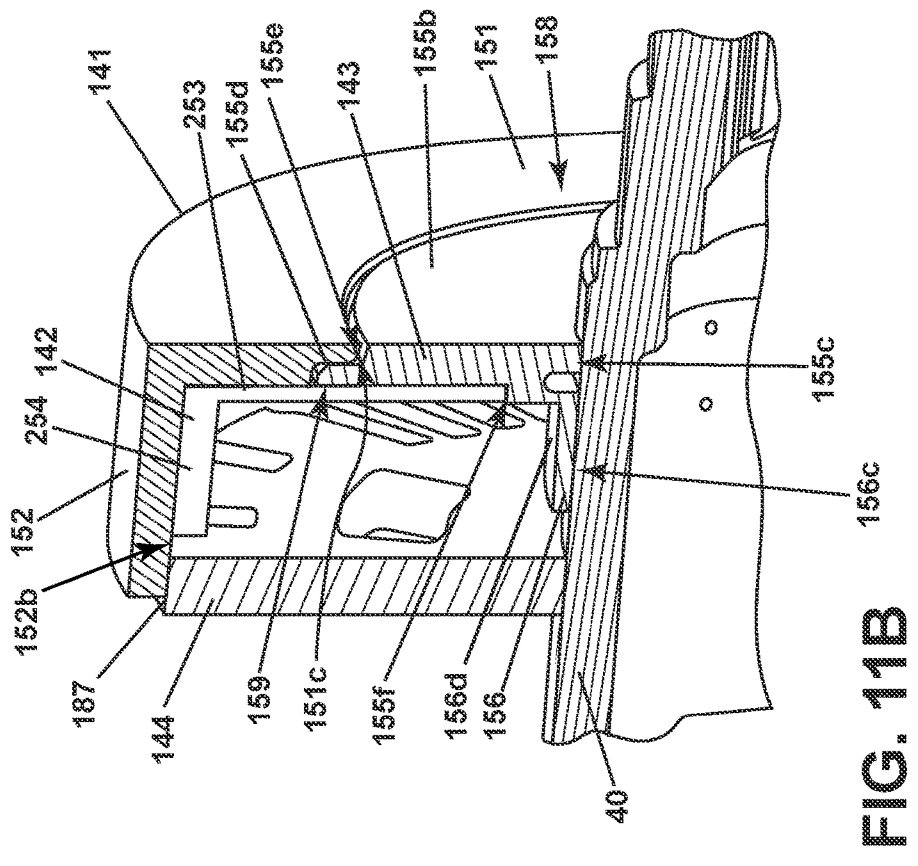
FIG. 11B is a cross-section of a portion of the rotor assembly of FIG. 11A taken along line V-V, with some parts omitted, in accordance with various aspects described herein.
Figure 11A:
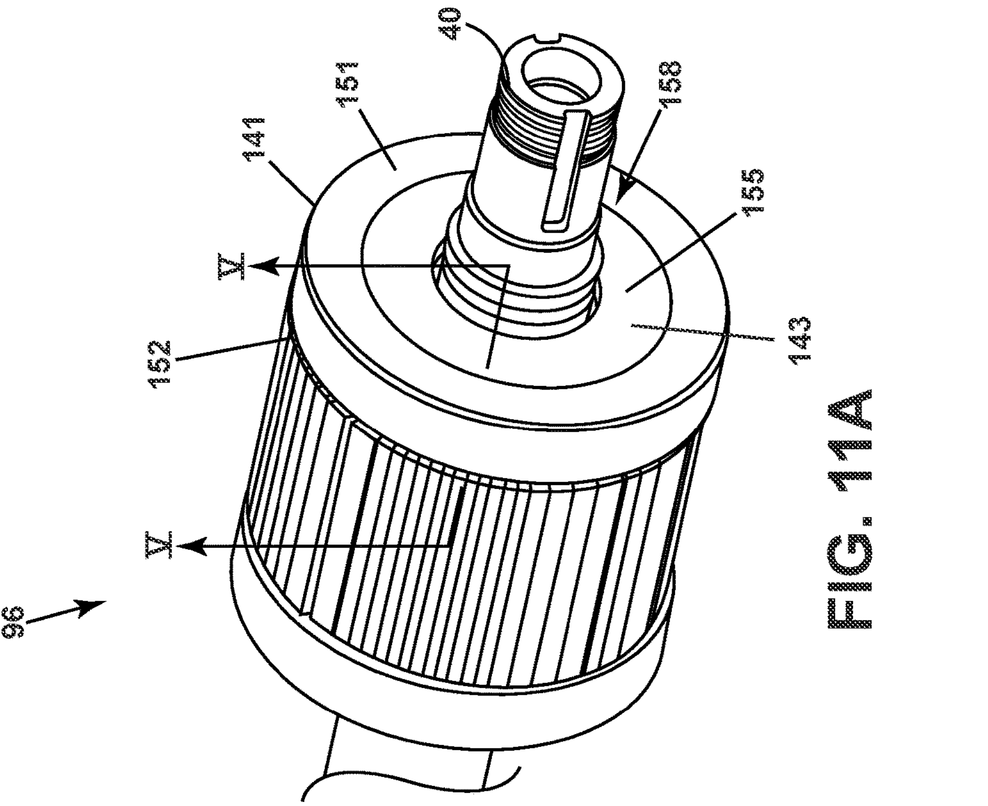
FIG. 11A is a perspective view of the assembled end winding support assembly of FIG. 4, in accordance with various aspects described herein.

FIG. 11A depicts a perspective view of the assembled rotor assembly 96 of FIG. 4, and FIG. 11B is a cross-section of a portion of the rotor assembly 96 of FIG. 11A taken along line V-V, with some parts (e.g., the rotor winding end turns 112, and coolant distribution ring 145) omitted for clarity.

With simultaneous reference to FIGS. 11 and 11A, the first wall 151 of the first collar 141 can be coupled along the third surface 151*c* to the fifth wall 155 of the coupling disc 143 along the radially outer periphery 159. For example, in non-limiting aspects, the radially outward-facing fourteenth surface 155*d* of the fifth wall 155 can be coupled to the third surface 151*c* of the first collar 141. Additionally, or alternatively a radially inboard portion of the first wall 151 can be disposed in the annular recess 155*e* or seat portion defined along the radially outer periphery 159 of the coupling disc 143 in a nested relationship. When assembled, the recess 155*e* can receive a portion of the first wall 151 therein, such that the first surface 151*a* of the first wall 151 and the twelfth surface 155*b* of the fifth wall 155 can cooperatively define a continuous axially outward-facing surface 158 via the nested relationship. By arranging the continuous axially outward-facing surface 158, undesired gaps, openings, or other discontinuities at the corresponding end 102, 104 of the rotor core 100 can be reduced over conventional arrangements, and consequent beneficial reductions in windage losses can be obtained.

The first collar 141 can also be coupled to the support disc 144. For example, the first collar 141 can be coupled along the fifth surface 152*b* to the radially outer periphery 189 (e.g., the twentieth surface 187) of the support disc 144. In non-limiting aspects, the first collar 141 can be coupled to the support disc 144 via an interference, friction, or press-fit engagement between the first collar 141 and the support disc 144. For example, in non-limiting aspects, the first diameter D1 can be arranged to be less than or equal to the second diameter D2, to enable a press fit between the second wall 152 of the first collar 141 and the fourth wall 254 of the second collar 142. Other aspects are not so limited, and it is contemplated that the first collar 141 can be coupled to the support disc 144 by any desired affixing mechanisms.

Furthermore, when assembled, the second collar 142 can optionally be coupled to the support disc 144. For example, the second collar 142 can be coupled along the eighth surface 253*c* to the lip 155*f* of the coupling disc 143. In other non-limiting aspects, the second collar 142 can be coupled along the eighth surface 253*c* to the sixteenth surface 156*d* of the coupling disc 143. In non-limiting aspects, the second collar 142 can be coupled to the coupling disc 143 via an interference, friction, or press-fit engagement between the second collar 142 and the coupling disc 143. Other aspects are not so limited, and it is contemplated that the second collar 142 can be coupled to the coupling disc 143 by any desired affixing mechanisms. In still other aspects, the second collar 142 can be disposed between the first collar 141 and the support disc 144 without being coupled to the coupling disc 143.

In addition to being coupled to the first collar 141 and second collar, the coupling disc 143 is coupled to the rotatable shaft 40. The coupling disc 143 can be coupled to the rotatable shaft 40 via one or more of the fifth, sixth, and seventh walls 155, 156, 157 (shown in FIG. 7). For example, the coupling disc 143 can be fixed to the rotatable shaft 40 along the radially inward-facing thirteenth surface 155*c*, fifteenth surface 156*c*, seventeenth surface 157*c* (shown in FIG. 7), or combinations thereof, using one or more bolts, screws, pins, keys, splines, or other known fasteners (not shown). In other non-limiting aspects, the coupling disc 143 can be coupled to the rotatable shaft 40 via an interference, friction, or press-fit engagement between the coupling disc 143 and the rotatable shaft 40. Other aspects are not so limited, and it is contemplated that the coupling disc 143 can be rotatably coupled to the rotatable shaft 40 by any desired affixing mechanisms. It will be appreciated that when so coupled, a rotation of the rotatable shaft 40 will result in a corresponding rotation of the coupling disc 143.

In addition to being coupled to the first collars 141, the support disc 144 is coupled to the rotatable shaft 40. For example, in non-limiting aspects, the support disc 144 can be fixed to the rotatable shaft 40 along the nineteenth surface 186 using one or more bolts, screws, pins, keys, splines, or other known fasteners (not shown). In other non-limiting aspects, the support disc 144 can be coupled to the rotatable shaft 40 via an interference, friction, or press-fit engagement between the support disc 144 and the rotatable shaft 40. Other aspects are not so limited, and it is contemplated that the support disc 144 can be rotatably coupled to the rotatable shaft 40 by any desired affixing mechanisms.

It will be appreciated that when so coupled, a rotation of the rotatable shaft 40 will result in a corresponding rotation of the support disc 144 and coupling disc 143, thereby resulting in a rotation of the first and second collars 141, 142.

Figure 12:
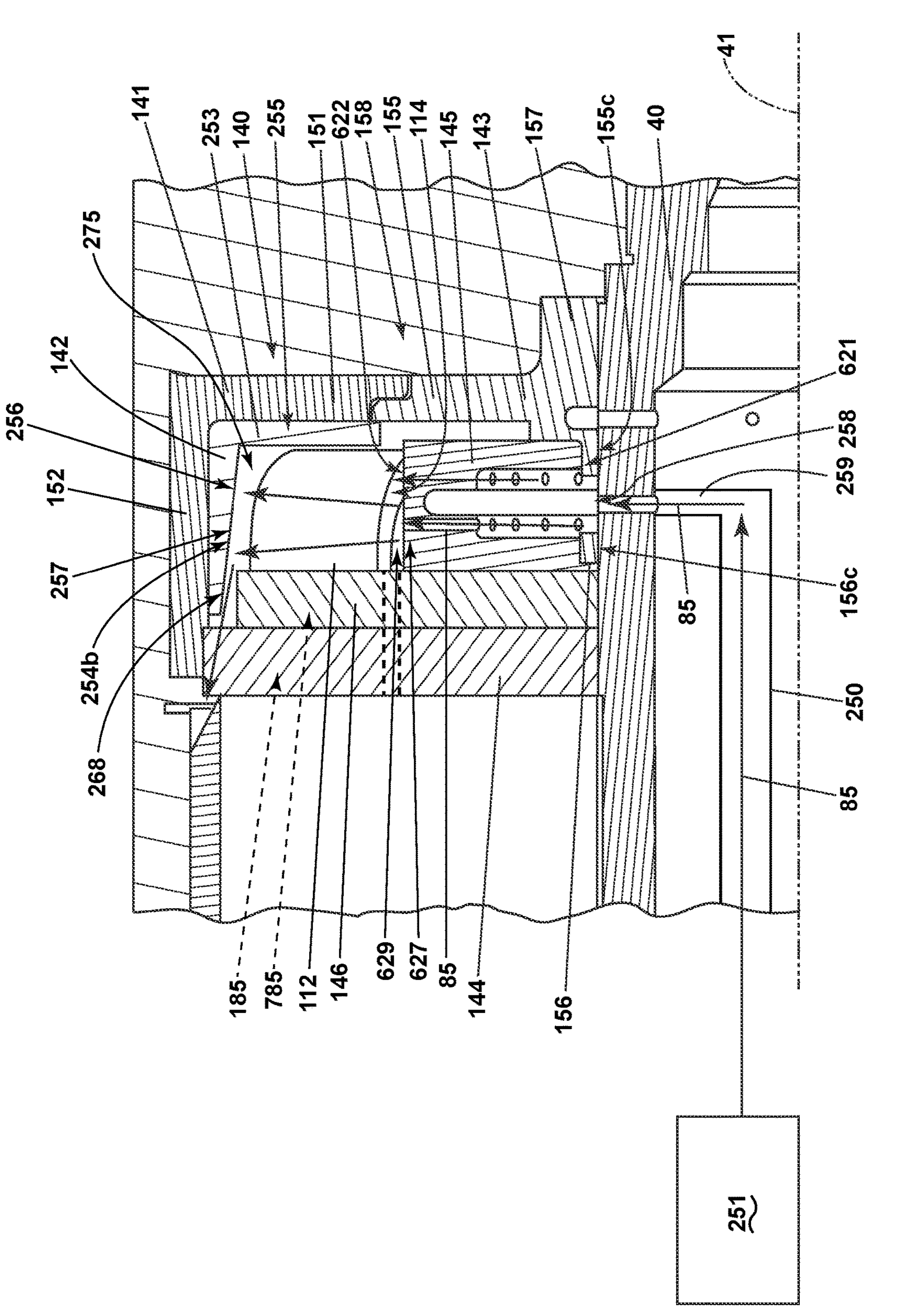
FIG. 12 is a zoomed cross-section of another exemplary rotor core and end winding support assembly, in accordance with various aspects described herein.

FIG. 12 schematically illustrates a portion another exemplary aspect of the rotor assembly 96 for better understanding the arrangement and operation of various aspects. The aspect depicted in FIG. 12 is similar to the aspect shown in FIG. 11B with one notable difference being the second collar 142 is not coupled to the sixth wall 156 of the coupling disc 143. As illustrated, the end winding support assembly 140, includes the first collar 141, second collar 142, coupling disc 143, support disc 144, coolant distribution ring 145, and spacer disc 146. The coupling disc 143 and support disc 144 are shown rotatably coupled to the rotatable shaft 40. The first and second collars 141, 142 and coolant distribution ring 145 are shown circumferentially surrounding and coupled to the coupling disc 143.

The coolant distribution ring 145 can be fixedly coupled to the coupling disc 143 using one or more bolts, screws, pins, keys, or other known fasteners. In other non-limiting aspects, the coolant distribution ring 145 can be coupled to the coupling disc 143 via an interference, friction, or press-fit engagement between the first coolant distribution ring 145 and the coupling disc 143. For example, the twenty-first surface 621 of the coolant distribution ring 145 can be fixedly coupled to the twelfth surface 155*b* of the coupling disc 143. Additionally, the set of apertures 258 can be in fluid communication with the twelfth surface 155*b*. Other aspects are not so limited, and it is contemplated that coolant distribution ring 145 can be rotatably coupled to the coupling disc 143 by any desired affixing mechanisms. It will be appreciated that when so coupled, a rotation of the coupling disc 143 will result in rotation of the coolant distribution ring 145.

An annular gap or cavity 275 is radially defined between the outer periphery or radially outwardly facing, twenty-second surface 622 of the coolant distribution ring 145 and the radially inward-facing ninth surface 254*a* of the fourth wall 254 of the second collar 142. The cavity 275 can axially extend between the spacer disc 146 and the third wall 253 of the second collar 142. The rotor winding end turns 112 are disposed to extend into the cavity 275.

The coolant distribution ring 145 is disposed to at least partially underlie the rotor winding end turns 112. In this example, "underlie" denotes a relative position radially closer to the rotational axis 41 of the rotatable shaft 40. In non-limiting aspects, the twenty-second surface 622 is arranged proximal to and facing the rotor winding end turns 112. In non-limiting aspects, the second collar 142 can at least partially overlie the rotor winding end turns 112. In this example, "overlie" denotes a relative position radially farther from the rotational axis 41 of the rotatable shaft 40.

In this way, the coolant distribution ring 145 and second collar 142 can cooperatively support, or otherwise limit a radial movement of the rotor winding end turns 112 disposed within the cavity 275. Additionally, the spacer disc 146 and second collar 142 can cooperatively support, or otherwise limit an axial movement of each rotor winding end turn 112 disposed within the cavity 275.

A portion of the rotor windings 110 axially extending from the rotor core 100 can be disposed in the set of first slots 185 of the support disc 144 and extend axially therethrough. For example, a portion of each rotor winding 110 can axially extend from the rotor core 100 and axially through a respective first slot 185. A circumferentially width of each first slot 185 can be configured to retainably receive the rotor winding 110 therein. In this way, the support disc 144 can support, or otherwise limit a lateral movement of each rotor winding 110 disposed within a respective first slot 185.

Similarly, another portion of the rotor windings 110 axially extending from the rotor core 100 can be further disposed in the set of second slots 785 to extend axially therethrough. For example, a portion of each rotor winding 110 can axially extend from the rotor core 100 and axially through a respective second slot 785. A circumferentially width of each second slot 785 can be configured to retainably receive the rotor winding 110 therein. In this way, the spacer disc 146 can support, or otherwise limit a lateral movement of each rotor winding 110 disposed within a respective second slot 785.

In operation, with reference to FIG. 3, during operation of the generator 14, the rotation of the magnetic field generated by the set of rotor windings 110 relative to the set of stator windings 90 generates electricity in the stator windings 90. This magnetic interaction further generates heat in the set of rotor windings 110, rotor winding end turns 112, and stator windings 90. In accordance with aspects described herein, the fluid coolant flow 85 to can enter the rotatable shaft 40 of the rotor assembly 96 via one of the cooling fluid inlet ports 82, coolant inlet port 94, or both.

Referring again to FIG. 12, in operation, the end winding support assembly 140 is arranged to enable the fluid coolant flow (indicated by solid arrows) 85 to flow radially therethrough. The fluid coolant flow 85 is conveyed from the rotatable shaft 40 to the cavity 275 and the set of rotor winding end turns 112. The fluid coolant flow 85 can subsequently be delivered from the end winding support assembly 140 axially toward the rotor core 100 or radially toward the stator windings 90, or both.

For example, the rotatable shaft 40 can define a first coolant conduit 250 fluidly connected with a source of coolant 251. The source of coolant 251 can be, but is not limited to, the cooling fluid inlet port 82 (FIG. 3). The direction or location of the source of coolant 251 is not limited by the illustration and can be disposed in any location that is fluidly coupled to the first coolant conduit 250. It is further contemplated that additional conduit, pumps, valves, or other devices can be included to fluidly connect the source of coolant 251 and the first coolant conduit 250 without departing from the scope of the disclosure. The fluid coolant flow 85 can be conveyed through the rotatable shaft 40 via the first coolant conduit 250. For example, the first coolant conduit 250 can include a radially extending portion 259. The radially extending portion 259 can fluid couple the first coolant conduit 250 and the coupling disc 143. In operation, the fluid coolant flow 85 can flow radially outward through the radially extending portion 259 from the rotational axis 41 toward the coupling disc 143 due to the centrifugal force effects of the rotatable shaft 40.

The coupling disc 143 can receive the fluid coolant flow 85 from the first coolant conduit 250, via the radially extending portion 259 of the first coolant conduit 250, at the thirteenth surface 155*c* or fifteenth surface 156*c*, or both. For example, the fluid coolant flow 85 can collect on or at the thirteenth surface 155*c* or fifteenth surface 156*c*, or both, and be centrifugally conveyed radially outward through the set of apertures 258 to the coolant distribution ring 145

The fluid coolant flow 85 can be centrifugally conveyed through the coolant distribution ring 145. For example, the fluid coolant flow 85 can be centrifugally conveyed from the twenty-first surface 621 to the twenty-second surface 622 via the set of channels 627. In operation, the channels 627 can be in fluid communication with the rotatable shaft 40, or the set of fourth grooves 625, or both, to receive the fluid coolant flow 85 therefrom.

The fluid coolant flow 85 can be centrifugally conveyed from the coolant distribution ring to the cavity 275. For example, the coolant can be radially expelled from the channels 627 to the cavity 275 via the coolant outlets 629. The coolant outlets 629 are arranged to provide the fluid coolant flow 85 radially outwardly therefrom. In non-limiting aspects, the coolant outlet 629 can be configured to operatively spray finely atomized particles of coolant fluid toward the rotor winding end turns 112 and end turn passages 114 within the cavity 275.

The fluid coolant flow 85 is centrifugally conveyed to the end turn passages 114 between the rotor winding end turns 112. Fluid can flow radially outward through the end turn passages 114 that pass between the rotor winding end turns 112 which transfers heat from the set of rotor windings 110 into the coolant by conduction.

The fluid coolant flow 85 can be expelled radially from the rotor end turn passages 114 and received by the second collar 142. For example, the fluid coolant flow 85 can be received by the sixth surface 253*a* of the third wall 253 or the tenth surface 254*b* of the fourth wall 254, or both. In non-limiting aspects, the fluid coolant flow 85 can be received in the fluid collection surfaces of second grooves 256, third grooves 257 or both. The fluid coolant flow 85 received in the third grooves 257 can be centrifugally conveyed to the second grooves 256. Additionally, or alternatively, the fluid coolant flow 85 received in the first grooves 255, can be centrifugally conveyed to the second grooves 256.

As illustrated, in non-limiting aspects, one or more of the second grooves 256 can be tapered along the tenth surface 254*b* to define an angle 268 relative to the rotational axis 41, such that the second groove 256 can receive and redirect the fluid coolant flow 85 axially outward from the rotor end turn passages 114 and toward the support disc 144, and expelled from the cavity 275.

The fluid coolant flow 85 can be expelled radially from the second collar 142 and the radial rotor end turn passages 114. The fluid coolant flow 85 redirected by the second collar 142 can be delivered axially inward from the cavity 275 and through the set of first slots 185.

Figure 13:
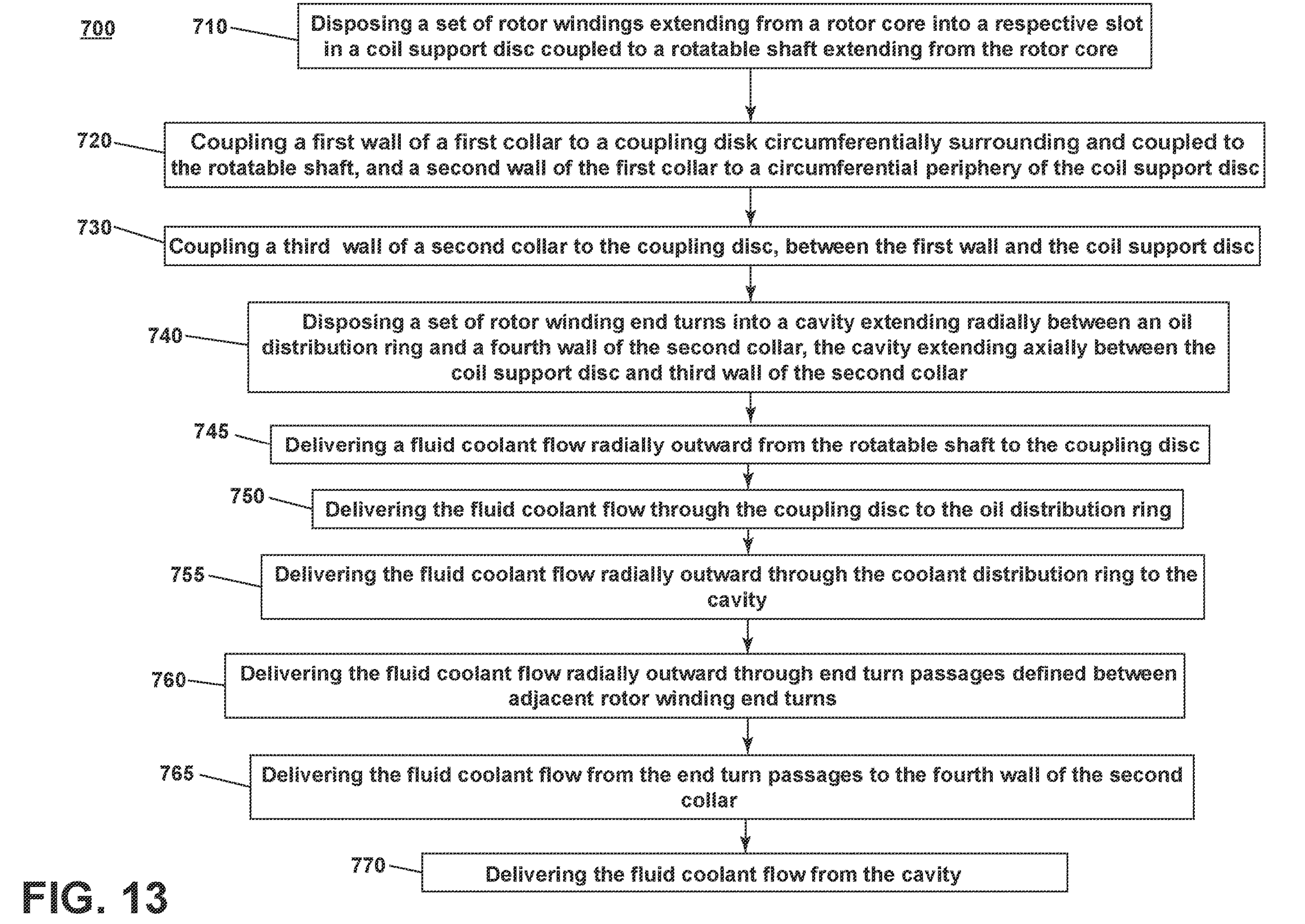
FIG. 13 illustrates an exemplary process flow diagram of a method of cooling a rotor assembly, in accordance with various aspects described herein.

FIG. 13 illustrates a method 700 of cooling the set of rotor winding end turns 112 of the rotor assembly 96. Although described in terms of a rotor assembly 96, it will be appreciated that the method 700 can be applied to any electrical machine. While the method will be described herein, for ease of understanding, in terms of the rotor assembly 96 of FIGS. 4-11, other aspects are not so limited and method 700 can be implemented with any electrical machine without departing from the scope of the disclosure.

At 710, the method 700 includes disposing a set of rotor windings 110 extending from a rotor core 100 into a respective slot 185 defined in the support disc 144 coupled to the rotatable shaft 40 extending from the rotor core 100.

The method 700 can include, at 720, coupling the first wall 151 of the first collar 141 to the coupling disc 143 circumferentially surrounding and coupled to the rotatable shaft 40, and the second wall 152 of the first collar 141 to a radially outer periphery 189 of the support disc 144. A non-limiting example of coupling the second wall 152 of the first collar 141 to the radially outer periphery 189 of the support disc 144 can include a press fit.

The method 700 can include at 730, coupling the third wall 253 of the second collar 142 to the coupling disc 143, between the first wall 151 and the support disc 144. A non-limiting example of coupling the third wall 253 of the second collar 142 to the coupling disc 143 can include a press fit.

The method 700 can include at 740, disposing a set of rotor winding end turns 112 into the cavity 275 extending radially between the coolant distribution ring 145 and the fourth wall 254 of the second collar 142. In non-limiting aspects, the cavity can extend axially between the support disc 144 and third wall 253 of the second collar 142. In non-limiting aspects, the cavity 275 can extend radially between the coolant distribution ring 145 and fourth wall 254 of the second collar 142.

The method 700 can include at 745, delivering a fluid coolant flow 85 radially outward from the rotatable shaft 40 to the coupling disc 143. A non-limiting example of delivering the fluid coolant flow 85 to the coupling disc 143 can include delivering the fluid coolant flow 85 through the rotatable shaft 40 via the first coolant conduit 250. The first coolant conduit 250 can include the radially extending portion 259 through which the fluid coolant flow 85 can flow radially outward from the rotational axis 41 due to the centrifugal force effects of the rotatable shaft 40.

The method 700 can include at 750, delivering the fluid coolant flow 85 through the coupling disc 143 to the coolant distribution ring 145. For example, the fluid coolant flow 85 can be delivered radially outward through the set of apertures 258 defined through the sixth wall 156 of the coupling disc 143 due to the centrifugal force effects of the rotatable shaft 40 driving a rotation of the coupling disc 143.

The method 700 can include at 755, delivering the fluid coolant flow 85 radially outward through the coolant distribution ring 145 to the cavity 275. For example, the fluid coolant flow 85 can be delivered radially outward through the set of channels 627 extending radially through coolant distribution ring 145 due to the centrifugal force effects of the rotatable shaft 40 driving a rotation of the coolant distribution ring 145.

The method 700 can include at 760, delivering the fluid coolant flow 85 radially through end turn passages 114 defined between adjacent rotor winding end turns 112. Heat from the set of rotor winding end turns 112 is transferred by conduction to the fluid coolant flow 85. The conduction of heat to the fluid coolant flow 85 can result in the fluid coolant flow 85 removing heat from the rotor assembly 96.

The method 700 can include at 765, delivering the fluid coolant flow 85 from the end turn passages 114 to the fourth wall 254 of the second collar 142.

The method 700 can include at 770, delivering the fluid coolant flow 85 from the cavity 275 through the respective slot 185 defined in the support disc 144. For example, in non-limiting aspects, the delivering the fluid coolant flow 85 axially inward from the cavity 275 can include delivering the fluid coolant flow 85 axially inward toward the rotor core 100, or radially outward toward the stator 54, or both.

The sequence depicted is for illustrative purposes only and is not meant to limit the method 700 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For example, one aspect of the disclosure contemplates coolant conduits that extend along alternative portions or lengths of the set of rotor windings. In another example, the windings or the coolant conduits can further include intervening thermally conductive layers to assist in thermal conduction while, for example, avoiding an electrically conductive relationship between respective components. Additionally, the design and placement of the various components such as valves, pumps, or conduits can be rearranged such that a number of different in-line configurations could be realized.

Aspects as disclosed herein improve upon existing methods by securing, protecting, and constraining the rotor winding end turns 112. Aspects as disclosed herein prevent movement of the rotor winding end turns 112 and provide mechanical and electrical isolation between the rotor winding end turns 112 and nearby parts.

The aspects disclosed herein provide method and apparatus for cooling a set of rotor windings or a set of rotor winding end turns during electric machine operations (e.g., motor or generator operations). One advantage that may be realized in the above aspects is that the above-described aspects have significantly improved thermal conduction to remove heat from the set of rotor windings or the set of rotor winding end turns. The improved thermal conductivity between the set of rotor winding end turns and the coolant conduits coupled with the coolant channels provide for heat removal in a much more effective fashion from the rotor winding end turns to the coolant.

The increased thermal dissipation of the rotor winding end turns allows for a higher speed rotation of the rotor, which may otherwise generate too much heat. The higher speed rotation may result in improved power generation or improved generator efficiency without increasing generator size. Reduced thermal losses in the electric machine allows for greater efficiency and greater power density of the generator.

When designing aircraft components, reliability is also informant feature. The above-described rotor end winding support assembly can provide additional physical stability and improved cooling to the rotor winding end turns. The stability and cooling provided by the aspects as described herein allow an increase in performance and reliability.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A support assembly for a set of rotor winding end turns extending from a rotor core of an electrical machine having a rotatable shaft, the support assembly comprising: a first collar including a first wall having an annular first surface facing an axial end of the rotor core, an opposing annular second surface, and an annular third surface defining a first bore extending from the annular first surface to the annular second surface, the first collar further including an annular second wall coupled to the first wall and extending axially therefrom toward the rotor core arranged to radially overlie the rotor winding end turns, the annular second wall having an radially outward facing annular fourth surface, and an opposing annular fifth surface facing the rotor winding end turns; a second collar axially disposed between the rotor core and the first collar, including a third wall disposed between the first wall and the rotor winding end turns, the third wall having an annular sixth surface facing the axial end of the rotor core, an opposing seventh surface, the third wall further including an annular eighth surface defining a second bore, the second collar further including an annular fourth wall coupled to the third wall and extending axially therefrom toward the rotor core and disposed between the rotor winding end turns and the annular second wall; and a coupling disc including an annular fifth wall facing the axial end of the rotor core, the coupling disc further including an annular sixth wall coupled to the annular fifth wall and extending axially therefrom toward the rotor core and radially underlying the rotor winding end turns, the annular sixth wall circumferentially surrounding and coupled to the rotatable shaft; wherein the first collar is coupled along the annular third surface to the annular fifth wall at an outer periphery of the coupling disc, and wherein the second collar is coupled to the coupling disc along the annular eighth surface.

The support assembly of the preceding clause, wherein the second collar is electrically insulative.

The support assembly of any preceding clause, further comprising a support disc defining a fourth bore sized to receive the rotatable shaft therethrough, and a radially outer periphery, the support disc further defining a set of radially extending first slots sized to receive a respective rotor winding axially therein, the support disc coupled to the rotatable shaft at the fourth bore, and disposed axially between the rotor core and the second collar; and wherein the annular fifth surface of the first collar is coupled to the radially outer periphery of the support disc.

The support assembly of any preceding clause, wherein the annular fifth surface of the first collar is coupled to the radially outer periphery of the support disc via an interference fit.

The support assembly of any preceding clause, wherein the coupling disc is coupled to the rotatable shaft via an interference fit.

The support assembly of any preceding clause, further comprising a coolant distribution ring defining a central fifth bore, and circumferentially surrounding and coupled to the annular sixth wall of the coupling disc, the coolant distribution ring radially disposed between the annular sixth wall and an end turn of the rotor windings.

The support assembly of any preceding clause, wherein a cavity is radially defined between the coolant distribution ring and the second collar, and wherein the rotor winding end turns extend into the cavity.

The support assembly of any preceding clause, wherein the coolant distribution ring includes a set of radially extending channels defined therethrough in fluid communication with the set of rotor winding end turns.

The support assembly of any preceding clause, wherein the annular sixth wall of the coupling disc defines a set of apertures extending radially therethrough in fluid communication with the coolant distribution ring.

The support assembly of any preceding clause, wherein the annular fourth wall of the second collar includes a radially inward facing tenth surface defining a set of axially extending grooves, in fluid communication with the coolant distribution ring.

The support assembly of any preceding clause, wherein the axially extending grooves define a taper.

The support assembly of any preceding clause, wherein the radially inward facing tenth surface further defines a set of circumferentially extending grooves, in fluid communication with the axially extending grooves.

The support assembly of any preceding clause, further comprising a spacer disc disposed axially between the support disc and the coolant distribution ring and rotatably coupled to the rotatable shaft, the spacer disc further including a radially outer surface defining a set of radially extending, circumferentially spaced second slots sized to receive a respective rotor winding therein.

The support assembly of any preceding clause, wherein the spacer disc is formed from an electrically insulative material.

The support assembly of any preceding clause, wherein a respective rotor winding end turn extends through a corresponding second slot.

A method of cooling a set of rotor winding end turns of a rotor core of an electrical machine, comprising: disposing a set of rotor windings extending from the rotor core into a respective first slot defined in a support disc coupled to a rotatable shaft extending from the rotor core; coupling a first wall of a first collar to a coupling disc circumferentially surrounding and coupled to the rotatable shaft, and coupling a second wall of the first collar to a radial outer periphery of the support disc; coupling a third wall of a second collar to the coupling disc, between the first wall and the spacer disc; disposing a set of rotor winding end turns into a cavity defined radially between a coolant distribution ring and a fourth wall of the second collar coupled to the third wall and extending axially therefrom toward the rotor core, and defined axially between the support disc and the third wall of the second collar; delivering a fluid coolant flow radially outward from the rotatable shaft to the coupling disc; delivering the fluid coolant flow through the coupling disc to the coolant distribution ring; and delivering the fluid coolant flow radially outward through the coolant distribution ring to the cavity.

The method of any preceding clause, further including delivering the fluid coolant flow radially through end turn passages defined between adjacent rotor winding end turns.

The method of any preceding clause, further including delivering the fluid coolant flow from the end turn passages to the fourth wall of the second collar.

The method of any preceding clause, further including delivering the fluid coolant flow from the cavity through the respective first slot defined in the support disc.

The method of any preceding clause, wherein delivering the fluid coolant flow from the cavity includes delivering the fluid coolant flow axially inward and radially outward.

What is claimed is:

1. A support assembly for a set of rotor winding end turns extending from a rotor core of an electrical machine having a rotatable shaft, the support assembly comprising:

a first collar including a first wall having an annular first surface facing an axial end of the rotor core, an opposing annular second surface, and an annular third surface defining a first bore extending from the annular first surface to the annular second surface, the first collar further including an annular second wall coupled to the first wall and extending axially therefrom toward the rotor core arranged to radially overlie the rotor winding end turns, the annular second wall having a radially outward facing annular fourth surface, and an opposing annular fifth surface facing the rotor winding end turns;

a second collar axially disposed between the rotor core and the first collar, including a third wall disposed between the first wall and the rotor winding end turns, the third wall having an annular sixth surface facing the axial end of the rotor core, and an opposing seventh surface, the third wall further including an annular eighth surface defining a second bore, the second collar further including an annular fourth wall coupled to the third wall and extending axially therefrom toward the rotor core and disposed between the rotor winding end turns and the annular second wall; and a coupling disc including an annular fifth wall facing the axial end of the rotor core, the coupling disc further including an annular sixth wall coupled to the annular fifth wall and extending axially therefrom toward the rotor core and radially underlying the rotor winding end turns, the annular sixth wall circumferentially surrounding and coupled to the rotatable shaft;

wherein the first collar is coupled along the annular third surface to the annular fifth wall at an outer periphery of the coupling disc, and wherein the second collar is coupled to the coupling disc along the annular eighth surface.

2. The support assembly of claim 1, wherein the second collar is electrically insulative.

3. The support assembly of claim 1, further comprising a support disc defining a fourth bore sized to receive the rotatable shaft therethrough, and a radially outer periphery, the support disc further defining a set of radially extending first slots sized to receive a respective rotor winding axially therein, the support disc coupled to the rotatable shaft at the fourth bore, and disposed axially between the rotor core and the second collar; and wherein the annular fifth surface of the first collar is coupled to the radially outer periphery of the support disc.

4. The support assembly of claim 3, wherein the annular fifth surface of the first collar is coupled to the radially outer periphery of the support disc via an interference fit.

5. The support assembly of claim 3, further comprising a coolant distribution ring defining a central fifth bore, and circumferentially surrounding and coupled to the annular sixth wall of the coupling disc, the coolant distribution ring radially disposed between the annular sixth wall and an end turn of the rotor windings.

6. The support assembly of claim 5, wherein a cavity is radially defined between the coolant distribution ring and the second collar, and wherein the rotor winding end turns extend into the cavity.

7. The support assembly of claim 5, wherein the coolant distribution ring includes a set of radially extending channels defined therethrough in fluid communication with the set of rotor winding end turns.

8. The support assembly of claim 5, wherein the annular sixth wall of the coupling disc defines a set of apertures extending radially therethrough in fluid communication with the coolant distribution ring.

9. The support assembly of claim 5, wherein the annular fourth wall of the second collar includes a radially inward facing tenth surface defining a set of axially extending grooves, in fluid communication with the coolant distribution ring.

10. The support assembly of claim 9, wherein the axially extending grooves define a taper.

11. The support assembly of claim 9, wherein the radially inward facing tenth surface further defines a set of circumferentially extending grooves, in fluid communication with the axially extending grooves.

12. The support assembly of claim 5, further comprising a spacer disc disposed axially between the support disc and the coolant distribution ring and rotatably coupled to the rotatable shaft, the spacer disc further including a radially outer surface defining a set of radially extending, circumferentially spaced second slots sized to receive a respective rotor winding therein.

13. The support assembly of claim 12, wherein the spacer disc is formed from an electrically insulative material.

14. The support assembly of claim 12, wherein a respective rotor winding end turn extends through a corresponding second slot.

15. The support assembly of claim 1, wherein the coupling disc is coupled to the rotatable shaft via an interference fit.

* * * * *